US010928231B2

(12) United States Patent
Morino et al.

(10) Patent No.: US 10,928,231 B2
(45) Date of Patent: Feb. 23, 2021

(54) THERMAL FLOW METER WITH HOUSING SURFACES THAT MINIMIZE VORTEX FORMATION

(71) Applicant: HITACHI AUTOMOTIVE SYSTEMS, LTD., Ibaraki (JP)

(72) Inventors: Takeshi Morino, Hitachinaka (JP);
Shinobu Tashiro, Hitachinaka (JP);
Akira Uenodan, Hitachinaka (JP);
Tomoaki Saito, Hitachinaka (JP);
Masashi Fukaya, Tokyo (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 172 days.

(21) Appl. No.: 15/765,939

(22) PCT Filed: Oct. 5, 2016

(86) PCT No.: PCT/JP2016/079567
§ 371 (c)(1),
(2) Date: Apr. 4, 2018

(87) PCT Pub. No.: WO2017/073276
PCT Pub. Date: May 4, 2017

(65) Prior Publication Data
US 2019/0120674 A1    Apr. 25, 2019

(30) Foreign Application Priority Data
Oct. 28, 2015 (JP) .................................. 2015-211399

(51) Int. Cl.
*G01F 1/684* (2006.01)

(52) U.S. Cl.
CPC ............ *G01F 1/684* (2013.01); *G01F 1/6842* (2013.01)

(58) Field of Classification Search
CPC .......... G01F 1/68; G01F 1/684; G01F 1/6842; G01F 1/6845; G01F 1/692
See application file for complete search history.

(56) References Cited

U.S. PATENT DOCUMENTS

| | | | | |
|---|---|---|---|---|
| 6,701,781 B1 * | 3/2004 | Lutowsky, Jr. | ....... | G01F 1/6842 73/204.25 |
| 6,912,899 B2 * | 7/2005 | Satou | ..................... | G01F 1/684 73/204.22 |

(Continued)

FOREIGN PATENT DOCUMENTS

| JP | 6-307906 A | 11/1994 |
|---|---|---|
| JP | 4488031 B2 | 6/2010 |

(Continued)

OTHER PUBLICATIONS

International Search Report for WO 2017/073276 A1, dated Nov. 29, 2016.

(Continued)

*Primary Examiner* — Justin N Olamit
(74) *Attorney, Agent, or Firm* — Volpe Koenig

(57) ABSTRACT

The present invention addresses the problem of obtaining a thermal flow meter capable of reducing a pulsation error by preventing a discharge port and a main outlet from being blocked by a vortex during a transient period and reducing a difference between flow speed distributions in normal and pulsation states. This thermal flow meter is provided with a housing disposed in a main passage; and a sub passage provided in the housing. In addition, in the housing, a first outlet and a second outlet of the sub passage are disposed in a downstream end portion of the housing, and a curved surface section is provided adjacent to the first and second outlets.

7 Claims, 26 Drawing Sheets

(56) References Cited

U.S. PATENT DOCUMENTS

| | | | |
|---|---|---|---|
| 7,437,925 B2* | 10/2008 | Ban | F02D 41/187 |
| | | | 73/202.5 |
| 10,168,195 B2* | 1/2019 | Morino | G01F 1/6842 |
| 2008/0307869 A1 | 12/2008 | Kamiya | |
| 2013/0008243 A1 | 1/2013 | Tagawa | |
| 2013/0014573 A1 | 1/2013 | Kamiya et al. | |
| 2013/0061684 A1 | 3/2013 | Frauenholz et al. | |

FOREIGN PATENT DOCUMENTS

| | | | | |
|---|---|---|---|---|
| JP | 5338864 B2 | 11/2013 | | |
| JP | 5397425 B2 | 1/2014 | | |
| WO | WO-2013187229 A1 * | 12/2013 | | G01F 15/14 |

OTHER PUBLICATIONS

Japanese Office Action dated Sep. 25, 2018 for the Japanese Patent Application No. 2017-547702.

* cited by examiner

THERMAL FLOW METER WITH HOUSING SURFACES THAT MINIMIZE VORTEX FORMATION

TECHNICAL FIELD

The present invention relates to a thermal flowmeter.

BACKGROUND ART

In the related art, there are proposed various thermal flowmeters in which a housing is disposed in a main passage through which a gas to be measured flows, the gas to be measured is incorporated into a bypass passage provided in the housing from the main passage, and a flow rate of the gas to be measured is measured by a flow rate measurement portion disposed in the bypass passage.

PTL 1 discloses a structure in which a bypass passage has a first passage along a flowing direction in a main passage, and a second passage which branches from the first passage on the halfway, a flow rate measurement portion is disposed in the second passage, and a gas to be measured having passed through the flow rate measurement portion joins the first passage again and is discharged from an outlet of the first passage.

CITATION LIST

Patent Literature

PTL 1: US2013/061684

SUMMARY OF INVENTION

Technical Problem

As in the structure disclosed in PTL 1, in a case where the outlet of the first passage is open toward a downstream side, the gas to be measured discharged from the outlet of the first passage interferes with a vortex generated on the downstream side of the housing, and thus there is concern that smooth discharge of the gas to be measured from the outlet is hindered. A difference between flow velocity distributions during normal times and during pulsation increases due to a change in vortex intensity, and thus a pulsation error occurs.

The present invention has been made in consideration of the circumstances, and an object thereof is to provide a thermal flowmeter having a structure in which vortex intensity is reduced and is also made to be constant, smooth discharge of a gas to be measured from an outlet is ensured, and the occurrence of a pulsation error can be suppressed.

Solution to Problem

In order to solve the problem, according to the present invention, there is provided a thermal flowmeter including a housing that is disposed in a main passage; and a bypass passage that is provided in the housing, in which, in the housing, an outlet of the bypass passage is provided at a downstream end portion of the housing, and an inclined surface is provided near the outlet.

Advantageous Effects of Invention

According to the present invention, it is possible to reduce the magnitude of a vortex which may be generated on a downstream side of a discharge port and a main outlet. Therefore, it is possible to prevent a discharge port and a main outlet from being shielded by a vortex during a transient period, to thus reduce a difference between flow velocity distributions during normal times and during pulsation, and to suppress the occurrence of a pulsation error.

DESCRIPTION OF EMBODIMENTS

Next, embodiments of the present invention will be described with reference to the drawings.

Example 1

Figure 1:
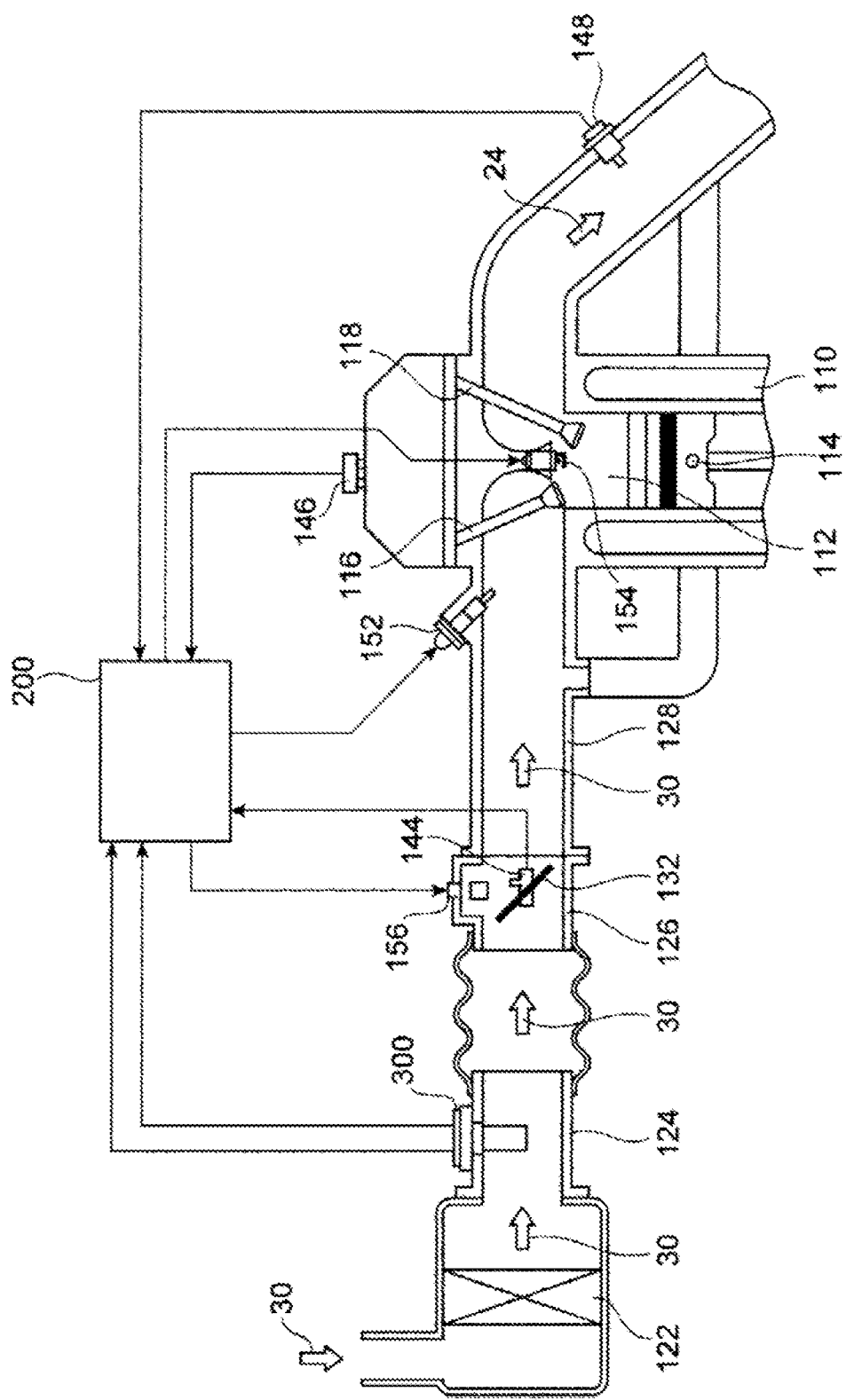
FIG. 1 is a system diagram illustrating one Example in which a thermal flowmeter according to the present invention is used in an internal combustion engine control system.

FIG. 1 is a system diagram illustrating one Example in which a thermal flowmeter according to the present invention is used in an internal combustion engine control system of an electronic fuel injection type. Intake air which is sucked from an air cleaner 122 as a gas 30 to be measured is guided to a combustion chamber of an engine cylinder 112 via, for example, a main passage 124 such as an intake body, a throttle body 126, an intake manifold 128 on the basis of an operation of an internal combustion engine 110 including the engine cylinder 112 and an engine piston 114. A flow rate of the gas 30 to be measured which is intake air guided to the combustion chamber is measured by a thermal flowmeter 300 according to the present invention, and a fuel is supplied from a fuel injection valve 152 on the basis of the measured flow rate, and is guided to the combustion chamber in a state of a mixed gas along with the gas 30 to be measured. In the present example, the fuel injection valve 152 is provided at an intake port of the internal combustion engine, a fuel injected into the intake port forms a mixed gas along with the gas 30 to be measured which is intake air, and is guided to the combustion chamber via an intake valve 116 so as to be burnt and to generate mechanical energy.

The fuel and the air guided to the combustion chamber are in a mixed state of the fuel and the air, and are explosively burnt due to spark ignition of an ignition plug 154 so as to generate mechanical energy. The burnt gas is guided to an exhaust tube via an exhaust valve 118, and is exhausted to the outside of a vehicle from the exhaust tube as an exhaust gas 24. A flow rate of the gas 30 to be measured which is intake air guided to the combustion chamber is controlled by a throttle valve 132 of which an opening degree changes on the basis of an operation on an accelerator pedal. A fuel supply amount is controlled on the basis of a flow rate of intake air guided to the combustion chamber, and a driver controls an opening degree of the throttle valve 132 so as to control a flow rate of intake air guided to the combustion chamber, and can thus control mechanical energy generated by the internal combustion engine.

A flow rate and the temperature of the gas 30 to be measured which is intake air taken in from the air cleaner 122 and flowing through the main passage 124 are measured by the thermal flowmeter 300, and electric signals indicating the flow rate and the temperature of the intake air is input to a control device 200 from the thermal flowmeter 300. An output from a throttle angle sensor 144 measuring an opening degree of the throttle valve 132 is input to the control device 200, and an output from a rotation angle sensor 146 is input to the control device 200 in order to measure a position or a state of the engine piston 114, the intake valve 116, or the exhaust valve 118 of the internal combustion engine, and a rotation speed of the internal combustion engine. An output from an oxygen sensor 148 is input to the control device 200 in order to measure a state of a mixture ratio between a fuel amount and an air amount on the basis of a state of the exhaust gas 24.

The control device 200 calculates a fuel injection amount or an ignition timing on the basis of the flow rate of the intake air which is an output from the thermal flowmeter 300, and the rotation speed of the internal combustion engine which is measured by using the output from the rotation angle sensor 146. A fuel amount supplied from the fuel injection valve 152 and the ignition timing at which a fuel is ignited by the ignition plug 154 are controlled on the basis of the calculation result. A fuel supply amount or an ignition timing is actually finely controlled on the basis of an intake air temperature or a change state of a throttle angle measured by the thermal flowmeter 300, a change state of an engine rotation speed, and a state of a fuel air ratio measured by the oxygen sensor 148. The control device 200 controls an amount of air bypassing the throttle valve 132 with an idle air control valve 156 in an idle operation state of the internal combustion engine, and controls a rotation speed of the internal combustion engine in the idle operation state.

FIG. 2 illustrates an exterior of the thermal flowmeter 300. FIG. 2A is a front view of the thermal flowmeter 300, FIG. 2B is a left side view thereof, FIG. 2C is a rear view thereof, and FIG. 2D is a right side view. The thermal flowmeter 300 has a housing 302. The housing 302 is inserted into the intake tube from a lateral side, and is disposed in the main passage 124 (refer to FIG. 1). A flange 305 for fixation to the intake tube, and an external connection portion 306 exposed to the outside of the intake tube are provided at a basal end part of the housing 302.

As a result of fixing the flange 305 to the intake tube, the housing 302 is supported in a cantilever state, and is disposed to extend along a vertical direction intersecting a main flow direction of a gas to be measured flowing through the main passage 124. The housing 302 is provided with a bypass passage 307 (refer to FIGS. 3A and 3B) for incorporating the gas 30 to be measured flowing through the main passage 124, and a flow rate measurement portion 602 (refer to FIGS. 3A and 3B) for measuring a flow rate of the gas 30 to be measured is disposed in the bypass passage 307.

Figure 2A:
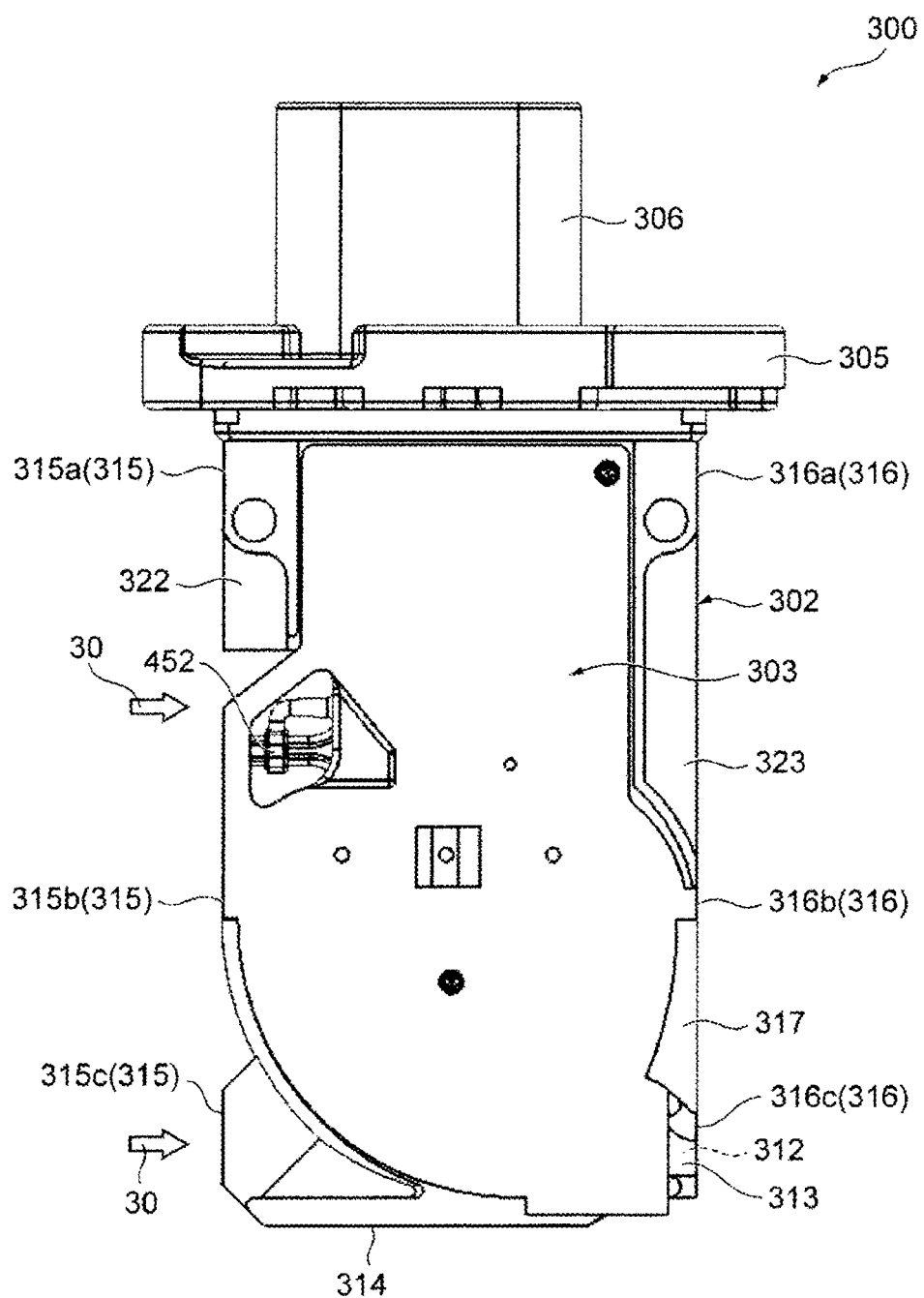
FIG. 2A is a front view illustrating an exterior of the thermal flowmeter according to the present invention.
Figure 2B:
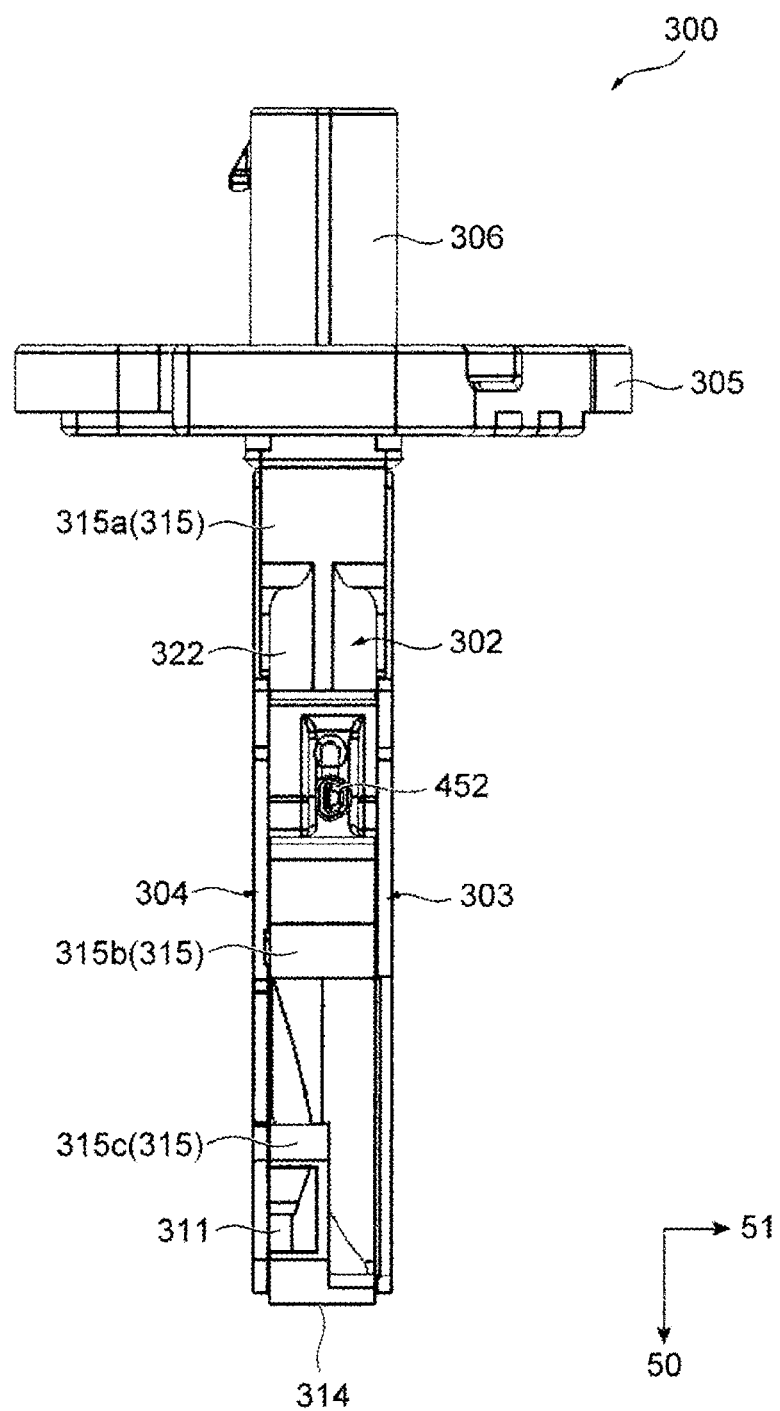
FIG. 2B is a left side view illustrating an exterior of the thermal flowmeter according to the present invention.
Figure 2C:
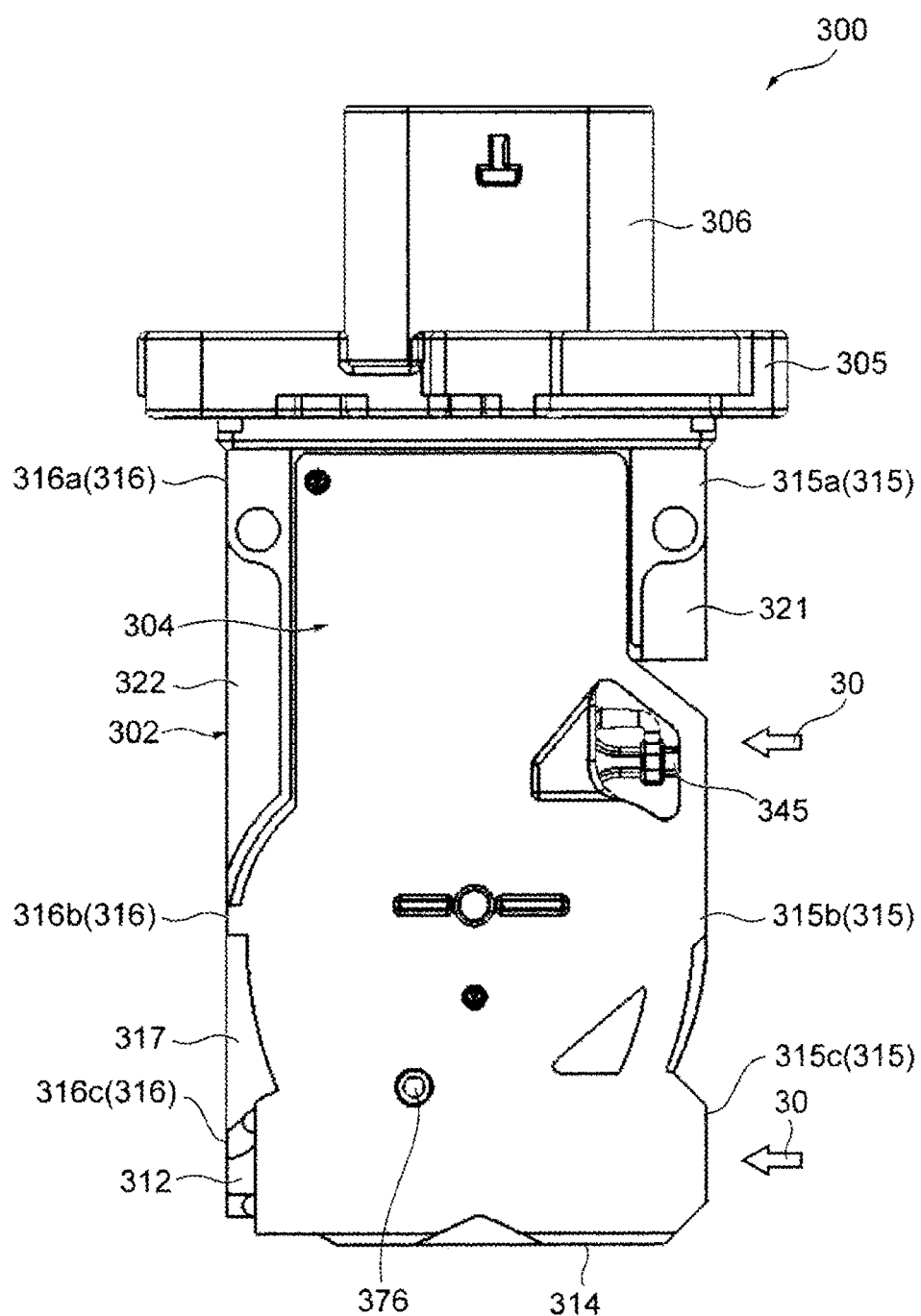
FIG. 2C is a rear view illustrating an exterior of the thermal flowmeter according to the present invention.
Figure 2D:
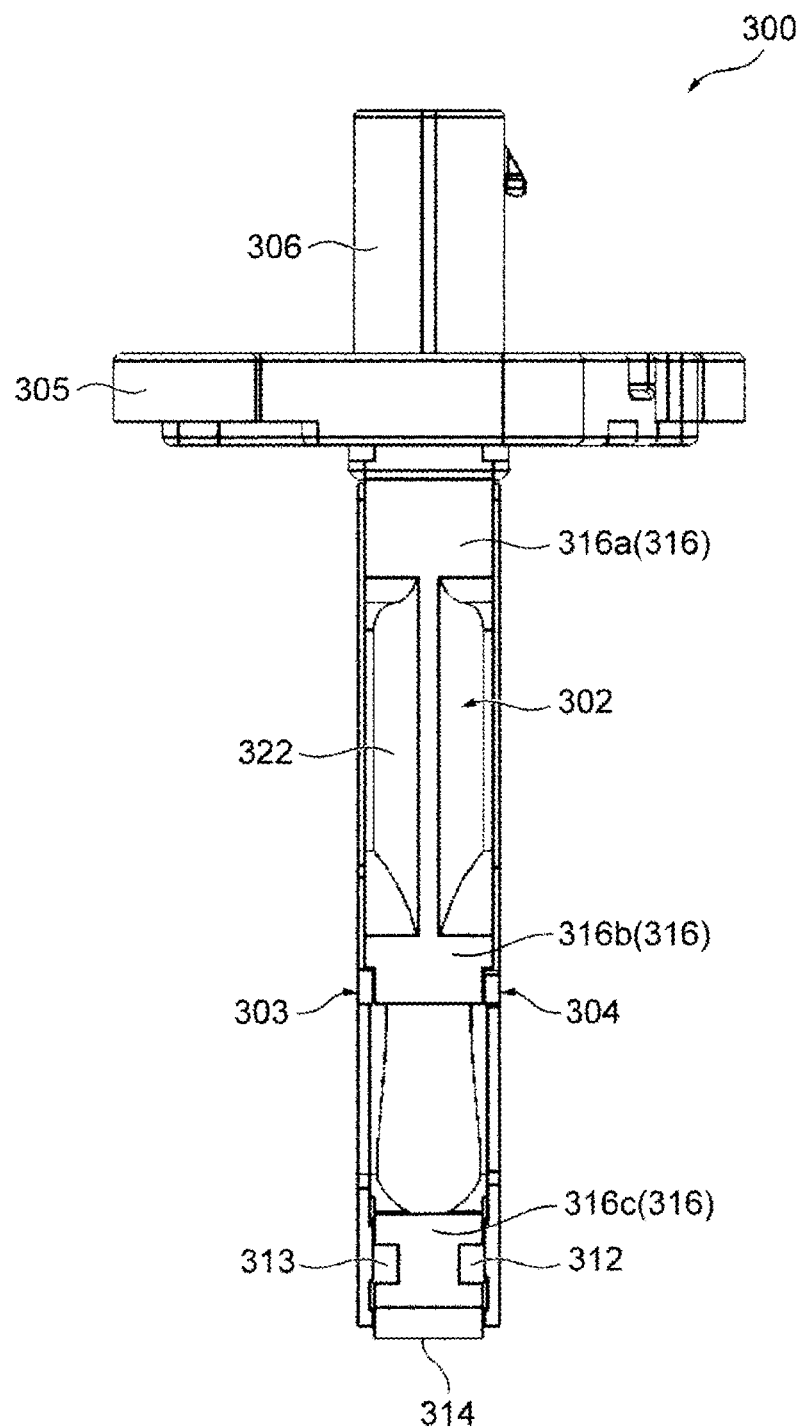
FIG. 2D is a right side view illustrating an exterior of the thermal flowmeter according to the present invention.

An inlet 311 for incorporating a part of the gas 30 to be measured into the bypass passage 307 is provided at an upstream end portion which is disposed on a distal end side of the housing 302 and on an upstream side of the main flow direction. Two outlets such as a first outlet 312 (discharge port) and a second outlet (main outlet) 313 for returning the gas 30 to be measured to the main passage 124 from the bypass passage 307 are provided at a downstream end portion which is disposed on the distal end side of the housing 302 and a downstream side in the main flow direction. The first outlet 312 and the second outlet 313 are disposed to be arranged horizontally in a thickness direction of the housing 302 as illustrated in FIG. 2D. In other words, the first outlet 312 and the second outlet 313 are disposed to be arranged in a direction perpendicular to the main flow direction.

The inlet 311 is provided on the distal end side of the housing 302, and thus a gas in a portion close to the central portion of the main passage separated from an inner wall surface can be incorporated into the bypass passage 307. Therefore, the gas is hardly influenced by the temperature or the inner wall surface of the main passage, and thus it is possible to prevent deterioration in measurement accuracy of a flow rate or the temperature of the gas.

In the vicinity of the inner wall surface of the main passage, fluid resistance is great, and a flow velocity is lower than an average flow velocity of the main passage, but, in the thermal flowmeter 300 of the present example, the inlet 311 is provided on the distal end side of the thin and long housing 302 which extends toward the center of the main passage from the flange 305, and thus a gas having a high flow velocity in the main passage central portion can be incorporated into the bypass passage 307. The first outlet 312 and the second outlet 313 of the bypass passage 307 are also provided on the distal end side of the housing 302, and thus a gas having flowed through the bypass passage 307 can be returned to the main passage central portion in which a flow velocity is high.

The housing 302 has a shape in which a front face is a substantially rectangular wide face, and a side face is narrow (a thickness is small). The front face and the rear face of the housing 302 are disposed along the main flow direction of the gas 30 to be measured flowing through the main passage, and the side face thereof is disposed to face the main flow direction. Consequently, the thermal flowmeter 300 can be provided with the bypass passage 307 reducing fluid resistance and having a sufficient length for the gas 30 to be measured.

In other words, in the thermal flowmeter of the present example, a shape of the housing projected onto an orthogonal plane which is orthogonal to the flow direction of the gas 30 to be measured flowing through the main passage 124 has a length dimension defined in a first direction 50 on the orthogonal plane and a thickness dimension defined in a second direction 51 perpendicular to the first direction 50 (refer to FIG. 2B), and has a shape in which the thickness dimension is smaller than the length dimension.

A temperature measurement portion 452 measuring the temperature of the gas 30 to be measured is provided in the housing 302. The housing 302 has a shape which is depressed toward the downstream end portion side at a longitudinal direction central portion and the upstream end portion, and the temperature measurement portion 452 is provided in the depressed position. The temperature measurement portion 452 has a shape which protrudes along the main flow direction from the depressed portion of the housing 302.

Figure 3A:
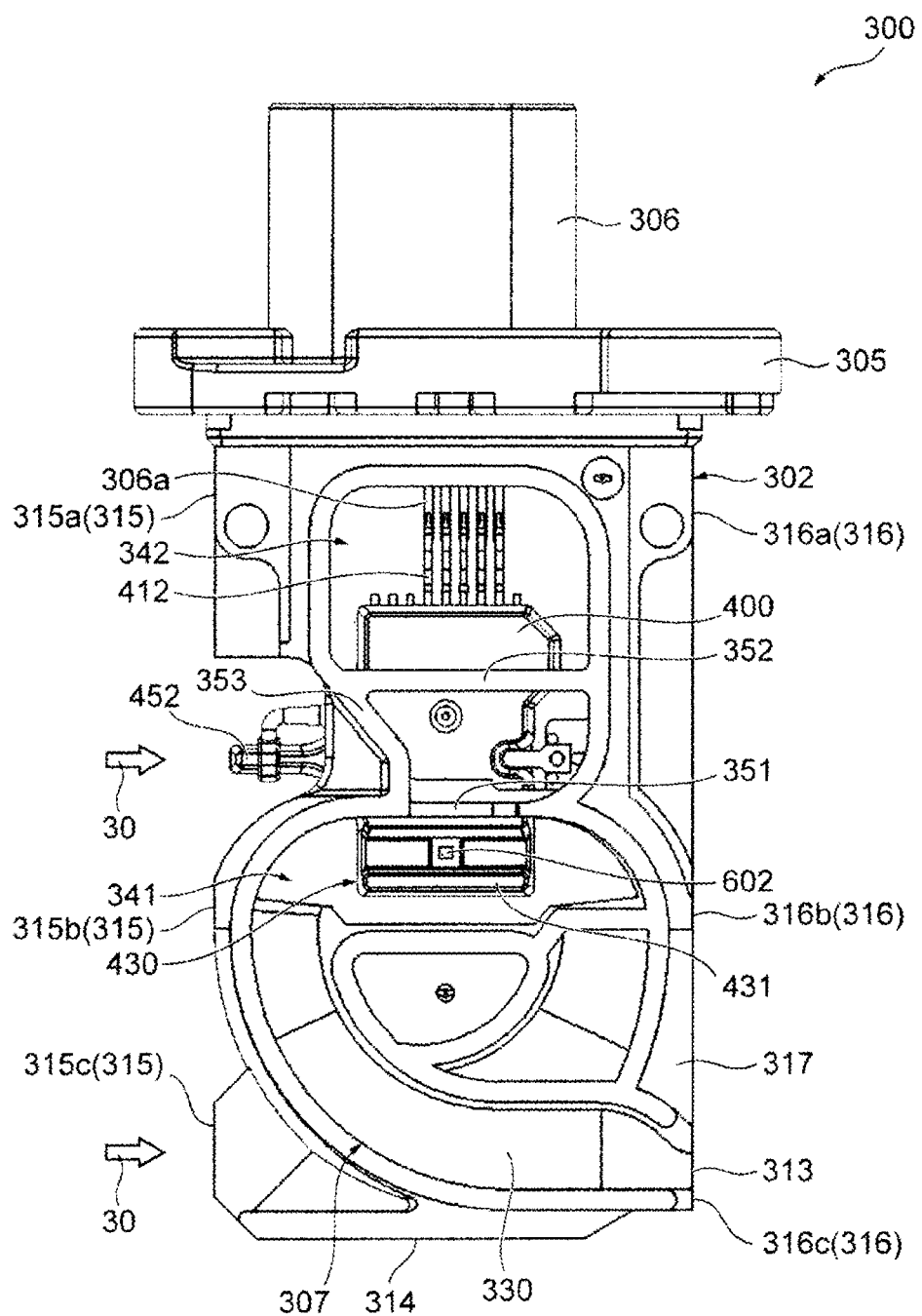
FIG. 3A is a front view illustrating a state of a housing in which a front cover and a rear cover are detached from the thermal flowmeter according to the present invention.
Figure 3B:
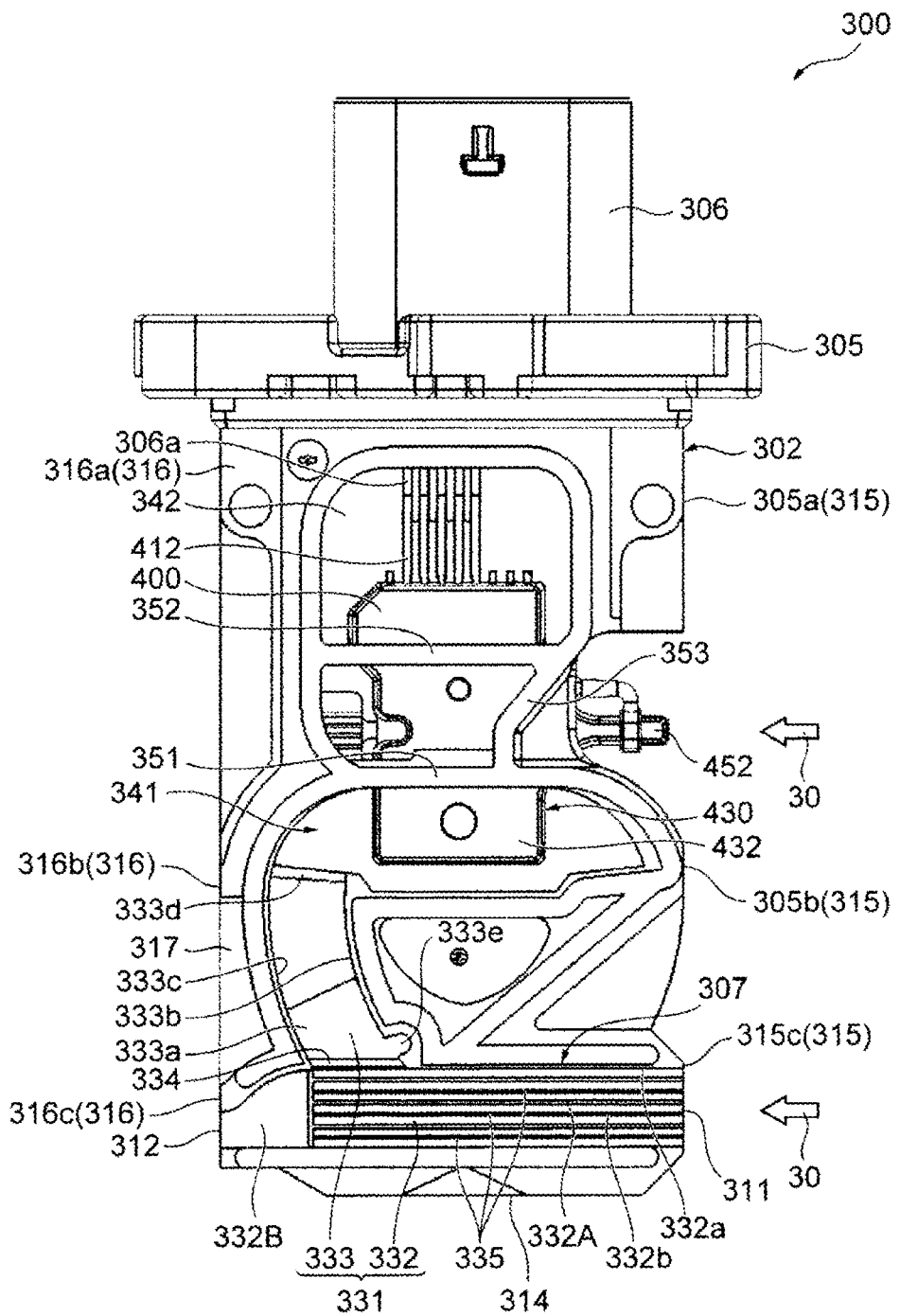
FIG. 3B is a rear view illustrating a state of a housing in which the front cover and the rear cover are detached from the thermal flowmeter according to the present invention.

FIG. 3 illustrates a state of the housing 302 in which a front cover 303 and a rear cover 304 are detached from the thermal flowmeter 300. FIG. 3A is a front view of the housing 302, and FIG. 3B is a rear view thereof.

An upstream end portion 315 of the housing 302 has a basal end part 315a, an intermediate part 315b, and a distal end part 315c. Each of the basal end part 315a, the intermediate part 315b, and the distal end part 315c is formed of a flat surface perpendicular to the main flow direction of the gas 30 to be measured. Tapered faces 322 which are widened to become distant from each other in the thickness width direction of the housing 302 from the upstream end portion 315 side toward a downstream end portion 316 side is provided between the basal end part 315a and the intermediate part 315b. A depressed portion which is depressed toward the downstream end portion 316 is provided between the tapered faces 322 and the intermediate part 315b, and the temperature measurement portion 452 is provided therein. The inlet 311 is provided at the distal end part 315c.

The downstream end portion 316 of the housing 302 has a basal end part 316a, an intermediate part 316b, and a distal end part 316c. Each of the basal end part 316a, the intermediate part 316b, and the distal end part 316c is formed of a flat surface perpendicular to the main flow direction of the gas 30 to be measured. Tapered faces 323 which are narrowed to come close to each other in the thickness width direction of the housing 302 from the upstream end portion 315 side toward the downstream end portion 316 side is provided between the basal end part 316a and the intermediate part 316b. The first outlet 312 and the second outlet 313 are provided at the distal end part 315c. The first outlet 312 and the second outlet 313 are disposed to be arranged in the thickness width direction of the housing 302, and are disposed at positions which are separated from each other from the center in the thickness width direction in the present example.

A circuit package 400 provided with the flow rate measurement portion 602 measuring a flow rate of the gas 30 to be measured flowing through the main passage 124 and the temperature measurement portion 452 measuring the temperature of the gas 30 to be measured flowing through the main passage 124 is integrally molded into the housing 302.

A bypass passage groove for molding the bypass passage 307 is formed in the housing 302. In the present example, bypass passage grooves are formed to be recessed on both of the front and rear surfaces of the housing 302, and the bypass passage 307 is formed by covering the front surface and the rear surface of the housing 302 with the front cover 303 and the rear cover 304. In this structure, both of a front side bypass passage groove 330 and a rear side bypass passage groove 331 can be molded as parts of the housing 302 by using metal molds provided on both sides of the housing 302 during molding of the housing 302 (resin mold process).

The bypass passage groove includes the rear side bypass passage groove 331 formed on the rear surface of the housing 302 and the front side bypass passage groove 330 formed on the front surface of the housing 302. The rear side bypass passage groove 331 includes a first groove portion 332 and a second groove portion 333 which branches from the first groove portion 332 on the halfway.

The first groove portion 332 linearly extends from the upstream end portion 315 to the downstream end portion 316 along the main flow direction of the gas 30 to be measured at the distal end part of the housing 302, and one end thereof communicates with the inlet 311 of the housing 302, and the other end thereof communicates with the outlet 312 of the housing 302. The first groove portion 332 has a linear part 332A which extends from the inlet 311 in a substantially constant sectional shape, and a narrow part 332B of which a groove width is gradually reduced from the linear part 332A toward the outlet 312.

A plurality of projections 335 are provided on a bottom wall surface 332b of the linear part 332A of the first groove portion 332. The plurality of projections 335 are provided to be arranged at a predetermined interval in a groove width direction of the first groove portion 332 on the bottom wall surface 332b of the linear part 332A of the first groove portion 332, and extend from the inlet 311 to the narrow part 332B along the linear part 332A. Each of the projections 335 has a trapezoidal shapes as a sectional shape, and thus both side surfaces thereof are obliquely inclined. Therefore, in a case where a water drop is attached thereto, a contact angle with the water drop is increased such that a height of the water drop can be reduced, and wettability is increased, and thus the water drop can be caused to flow quickly from the upstream side toward the downstream side. Therefore, it is possible to prevent a water drop from flowing into the second passage and to quickly discharge the water drop to the outside.

The second groove portion 333 branches from the linear part 332A of the first groove portion 332, proceeds toward the basal end side of the housing 302 while being curved, and communicates with a measurement channel 341 provided at the longitudinal direction central portion of the housing 302. The second groove portion 333 has an inlet which communicates with a sidewall surface 332a located on the basal end side of the housing 302 of a pair of sidewall surfaces forming the first groove portion 332, and a bottom wall surface 333a thereof is continued to be coplanar with the bottom wall surface 332b of the linear part 332A of the first groove portion 332. A recess part 333e is provided on a sidewall surface 333b of the second groove portion 333 on the inner peripheral side.

In a case where the gas 30 to be measured flowing through the main passage 124 collides with the thermal flowmeter 300, the gas 30 to be measured receives dynamic pressure from an outer wall surface serving as an obstacle oppositely to the flow direction thereof, and thus pressure on the upstream side facing the outer wall surface increases. On the other hand, the gas 30 to be measured on a sidewall which is parallel to or substantially parallel to the main flow direction of the gas 30 to be measured is separated from the wall surface in an upstream portion of the wall surface, and thus the separation portion (periphery) is brought into negative pressure. The gas 30 to be measured is directed toward the downstream direction from the portion where the separation occurs, and thus changes to a flow along the wall surface of the thermal flowmeter 300. In a case where water stays near the second groove portion 333, and a drain hole 376 which is bored at a position closing the recess part 333e in the rear cover 304, the water can be discharged from the recess part 333e in the bypass passage 307 to the outside of the bypass passage 307, that is, the main passage 124 via the drain hole 376 by negative pressure generated in the separation portion (periphery) of the thermal flowmeter 300.

The measurement channel 341 is formed to penetrate through the housing 302 in the thickness direction, and a channel exposure portion 430 of the circuit package 400 is disposed to protrude thereinto. The second groove portion 333 communicates with the measurement channel 341 further toward the bypass passage upstream side than the channel exposure portion 430 of the circuit package 400.

The second groove portion 333 has a shape in which a groove depth increases as a distance to the measurement channel 341 is reduced, and has, especially, a steep part 333d which is rapidly deepened in front of the measurement channel 341. Of a front surface 431 and a rear surface 432 of the channel exposure portion 430 of the circuit package 400, in the measurement channel 341, the steep part 333d causes a gas of the gas 30 to be measured to pass through the front surface 431 side on which the flow rate measurement portion 602 is provided, and causes a foreign substance such as dust contained in the gas 30 to be measured to pass through the rear surface 432 side.

The gas 30 to be measured flows through the rear side bypass passage groove 331, and is thus gradually moved in the direction of the front side (a depth side in FIG. 3B) of the housing 302. Part of air having small mass is moved along the steep part 333d so as to flow toward the front surface 431 of the channel exposure portion 430 in the measurement channel 341. On the other hand, a foreign substance having great mass hardly changes its course due to centrifugal force, thus does not flow along the steep part 333d, and flows toward the rear surface 432 of the channel exposure portion 430 in the measurement channel 341.

The flow rate measurement portion 602 is provided on the front surface 431 of the channel exposure portion 430 of the circuit package 400. The flow rate measurement portion 602 performs heat transfer with the gas 30 to be measured flowing toward the front surface 431 of the channel exposure portion 430, so as to measure a flow rate.

The gas 30 to be measured passes through the front surface 431 side and the rear surface 432 side of the channel exposure portion 430 of the circuit package 400, then flows into the front side bypass passage groove 330 from the bypass passage downstream side of the measurement channel 341 so as to flow through the front side bypass passage groove 330, and is then discharged to the main passage 124 from the second outlet 313.

As illustrated in FIG. 3A, the front side bypass passage groove 330 has one end which communicates with the bypass passage downstream side of the measurement channel 341, and the other end which communicates with the outlet 313 formed at the downstream end portion 316 on the distal end side of the housing 302. The front side bypass passage groove 330 is curved to gradually proceed toward the downstream end portion 316 as a distance to the distal end side of the housing 302 from the measurement channel 341 increases, extends linearly toward the main flow direction downstream side of the gas 30 to be measured at the distal end part of the housing 302, and has a shape in which a groove width is gradually reduced toward the second outlet 313.

In the present example, a channel formed by the rear side bypass passage groove 331 is directed toward the basal end side which is the flange 305 side from the distal end side of the housing 302 while being curved, the gas 30 to be measured flowing through the bypass passage 307 flows in an opposite direction to the main flow direction in the main passage 124 at a position closest to the flange 305, and the rear side bypass passage provided on the rear surface side of the housing 302 is connected to the front side bypass passage provided on the front surface side in this portion where the gas flows in the opposite direction.

The measurement channel 341 is divided into a space on the front surface 431 side and a space on the rear surface 432 side by the channel exposure portion 430 of the circuit package 400, and is not divided by the housing 302. In other words, the measurement channel 341 is formed to penetrate through the front surface and the rear surface of the housing 302, and the circuit package 400 is cantilevered and protrudes into this single space. With this configuration, bypass passage grooves can be molded on both of the front and rear surfaces of the housing 302 through a single resin mold process, and a structure connecting the bypass passage grooves on both sides can also be molded. The circuit package 400 is fixed to fixation portions 351, 352 and 353 of the housing 302 as a result of being buried in a resin mold.

According to the configuration, the circuit package 400 can be inserted into the housing 302 so as to be mounted therein when the housing 302 is molded by using a resin mold. In a case where either one of a passage upstream side which is the upstream side of the circuit package 400 and a passage downstream side which is the downstream side thereof penetrates in the width direction of the housing 302, a bypass passage shape connecting the rear side bypass passage groove 331 to the front side bypass passage groove 330 can be molded through a single resin mold process.

The front side bypass passage of the housing 302 is formed by bring a sidewall upper end corresponding to a groove height direction upper side of a pair of sidewall surfaces forming the front side bypass passage groove 330 into close contact with a facing surface of the front cover 303. The rear side bypass passage of the housing 302 is formed by bring a sidewall upper end corresponding to a groove height direction upper side of a pair of sidewall surfaces forming the rear side bypass passage groove 331 into close contact with a facing surface of the rear cover 304.

As illustrated in FIGS. 3A and 3B, a cavity 342 is formed in the housing 302 between the flange 305 and the portion where the bypass passage groove is formed. The cavity 342 is formed to penetrate through the housing 302 in the thickness direction. A terminal connection portion 320 which connects the connection terminal 412 of the circuit package 400 to an inner end 306a of an external terminal of the external connection portion 306 is disposed to protrude into the cavity 342. The connection terminal 412 and the inner end 306a are electrically connected to each other through spot welding, laser welding, or the like. The cavity 342 is closed by attaching the front cover 303 and the rear cover 304 to the housing 302, and is sealed by welding the periphery of the cavity 342 to the front cover 303 and the rear cover 304 through laser welding.

Figure 4A:
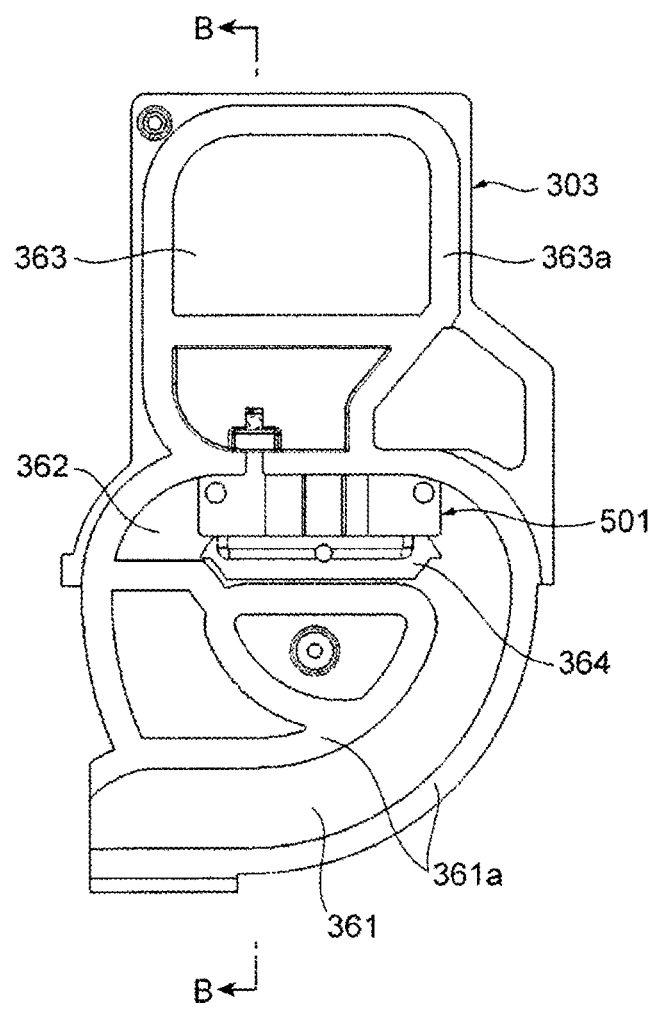
FIG. 4A is a rear view of the front cover.
Figure 4B:
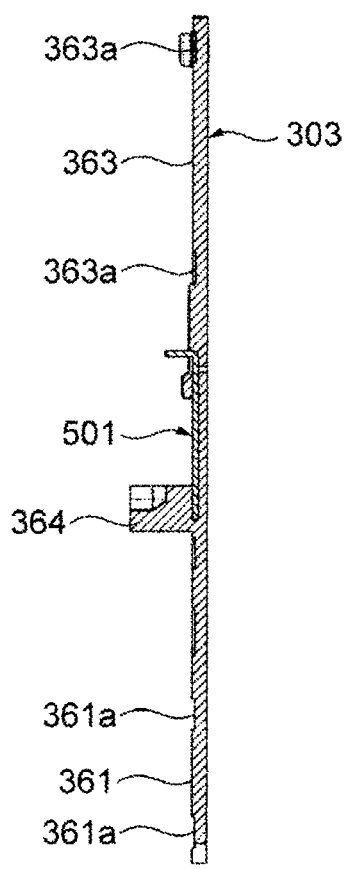
FIG. 4B is a sectional view taken along the line B-B in FIG. 4A.
Figure 5A:
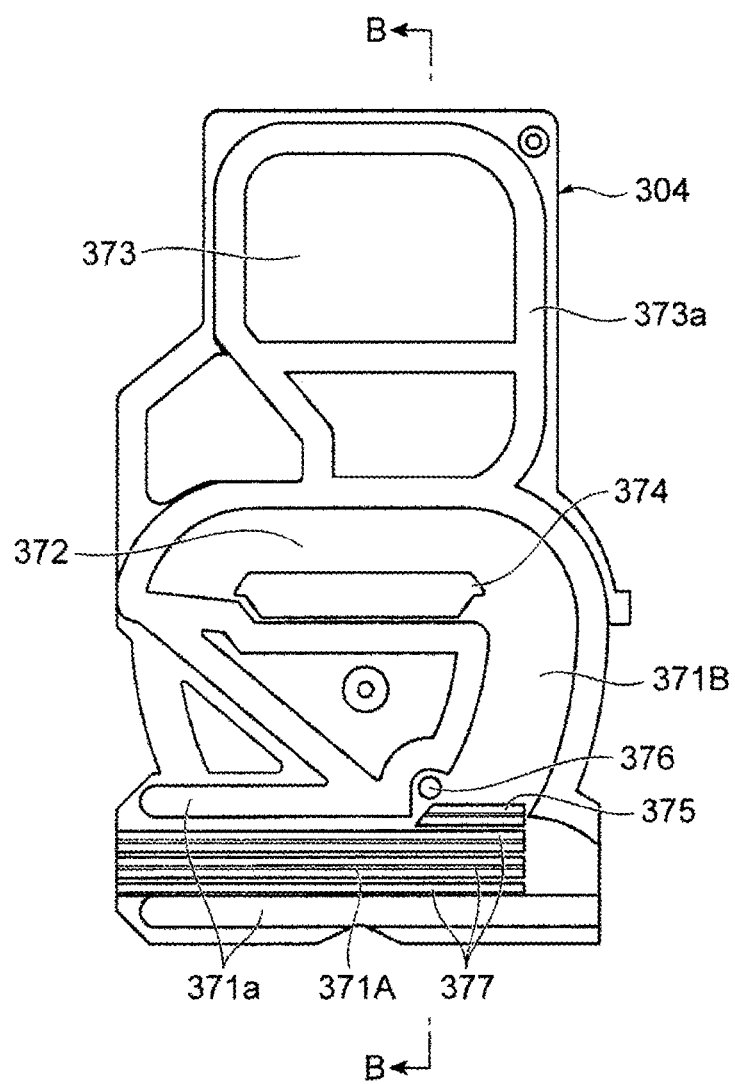
FIG. 5A is a rear view of the rear cover.
Figure 5B:
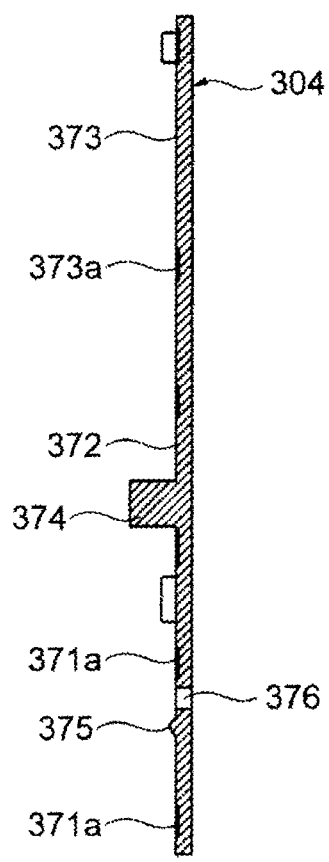
FIG. 5B is a sectional view taken along the line B-B in FIG. 5A.

FIG. 4A is a diagram illustrating a rear surface of the front cover, and FIG. 4B is a sectional view taken along the line B-B in FIG. 4A. FIG. 5A is a diagram illustrating a rear surface of the rear cover, and FIG. 5B is a diagram illustrating a side surface of the rear cover.

Each of the front cover 303 and the rear cover 304 has a thin tabular shape, and is formed in a shape having a wide cooling surface. Thus, the thermal flowmeter 300 reduces air resistance, and achieves an effect of being easily cooled by a gas to be measured flowing through the main passage 124.

The front cover 303 has a size to cover the front surface of the housing 302. A fifth region 361 closing the front side bypass passage groove 330 of the housing 302, a sixth region 362 closing the front side of the measurement channel 341 of the housing 302, and a seventh region 363 closing the front side of the cavity 342 are formed on the facing surface of the front cover 303. A recess part 361a which the sidewall upper end of the front side bypass passage groove 330 of the housing 302 enters is provided to be recessed on both sides of the fifth region 361 and the sixth region 362 in the width direction. A recess part 363a which a front side outer peripheral end of the cavity 342 enters is provided to be recessed near the seventh region 363.

A projecting part 364 which is inserted into a gap between a distal end of the channel exposure portion 430 of the circuit package 400 and the measurement channel 341 of the housing 302 is provided on the facing surface of the front cover 303. A metal plate 501 is provided at a position facing the front surface 431 of the channel exposure portion 430 of the circuit package 400.

The rear cover 304 has a size to cover the rear surface of the housing 302. A first region 371A closing the first groove portion 332 of the rear side bypass passage groove 331 of the housing 302, a second region 371B closing the second groove portion 333, a third region 372 closing the rear side of the measurement channel 341 of the housing 302, and a fourth region 373 closing the rear side of the cavity 342 are formed on the facing surface of the rear cover 304. A recess part 371a which the sidewall upper end of the rear side bypass passage groove 331 of the housing 302 enters is provided to be recessed on both sides of the first region 371A, the second region 371B, and the third region 372 in the width direction. A recess part 373a which a rear side outer peripheral end of the cavity 342 enters is provided to be recessed near the fourth region 373.

Projections 377 are provided in the first region 371A of the rear cover 304. Each of the projections 377 extends in a longitudinal direction, and a plurality of projections 377 are provided to be arranged in a transverse direction at a predetermined interval, in the first region 371A of the rear cover 304. Each of the projections 377 has a trapezoidal shapes as a sectional shape, and thus both side surfaces thereof are obliquely inclined. Therefore, in a case where a water drop is attached thereto, a contact angle with the water drop is increased such that a height of the water drop can be reduced, and wettability is increased, and thus the water drop can be caused to flow quickly from the upstream side toward the downstream side. Therefore, it is possible to prevent a water drop from flowing into the second passage and to quickly discharge the water drop to the outside.

The drain hole 376 which communicates with the bypass passage 307 is bored in the rear cover 304. The drain hole 376 is formed to penetrate through a position closing the recess part 333e of the housing 302 in a state in which the rear cover 304 is attached to the housing 302, and can discharge water incorporated into the recess part 333e of the second groove portion 333 in the bypass passage 307 to the outside.

A projecting part 374 which is inserted into the gap between the distal end of the channel exposure portion 430 of the circuit package 400 and the measurement channel 341 of the housing 302 is provided on the facing surface of the rear cover 304. The projecting part 374 fills the gap between the distal end of the channel exposure portion 430 of the circuit package 400 and the measurement channel 341 of the housing 302 in cooperation with the projecting part 364 of the front cover 303.

The front cover 303 and the rear cover 304 are respectively attached to the front surface and the rear surface of the housing 302, and form the bypass passage 307 in cooperation with the front side bypass passage groove 330 and the rear side bypass passage groove 331.

Figure 6:
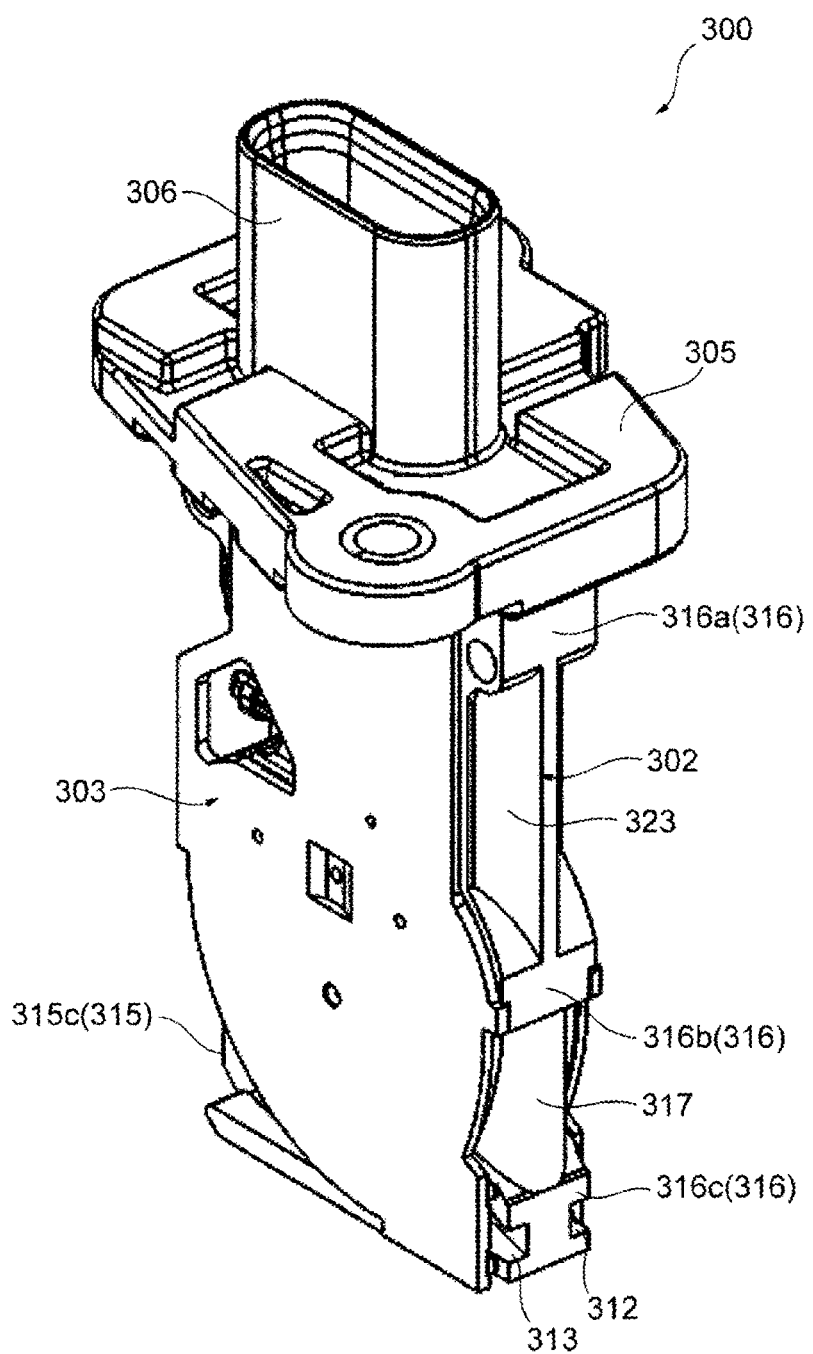
FIG. 6 is a perspective view illustrating an exterior of a thermal flowmeter in Example 1.
Figure 7A:
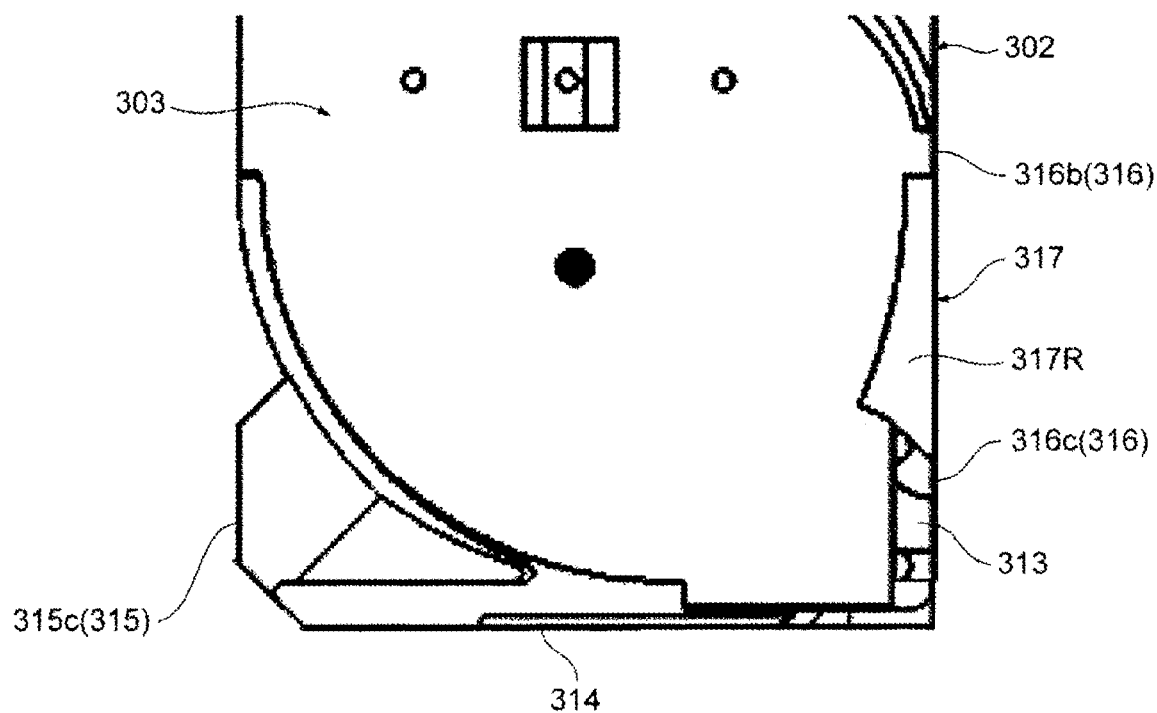
FIG. 7A is an enlarged view of main portions of the thermal flowmeter in Example 1.
Figure 7B:
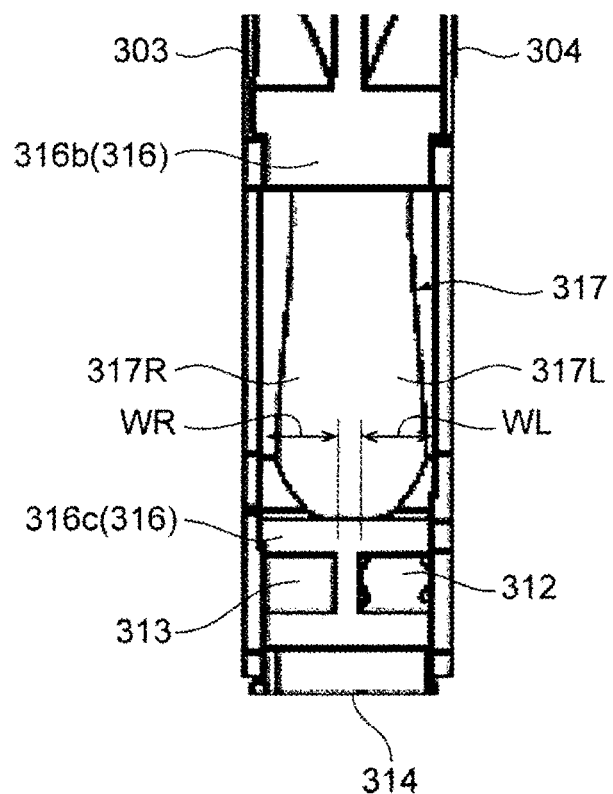
FIG. 7B is an enlarged view of main portions of the thermal flowmeter in Example 1.
Figure 7C:
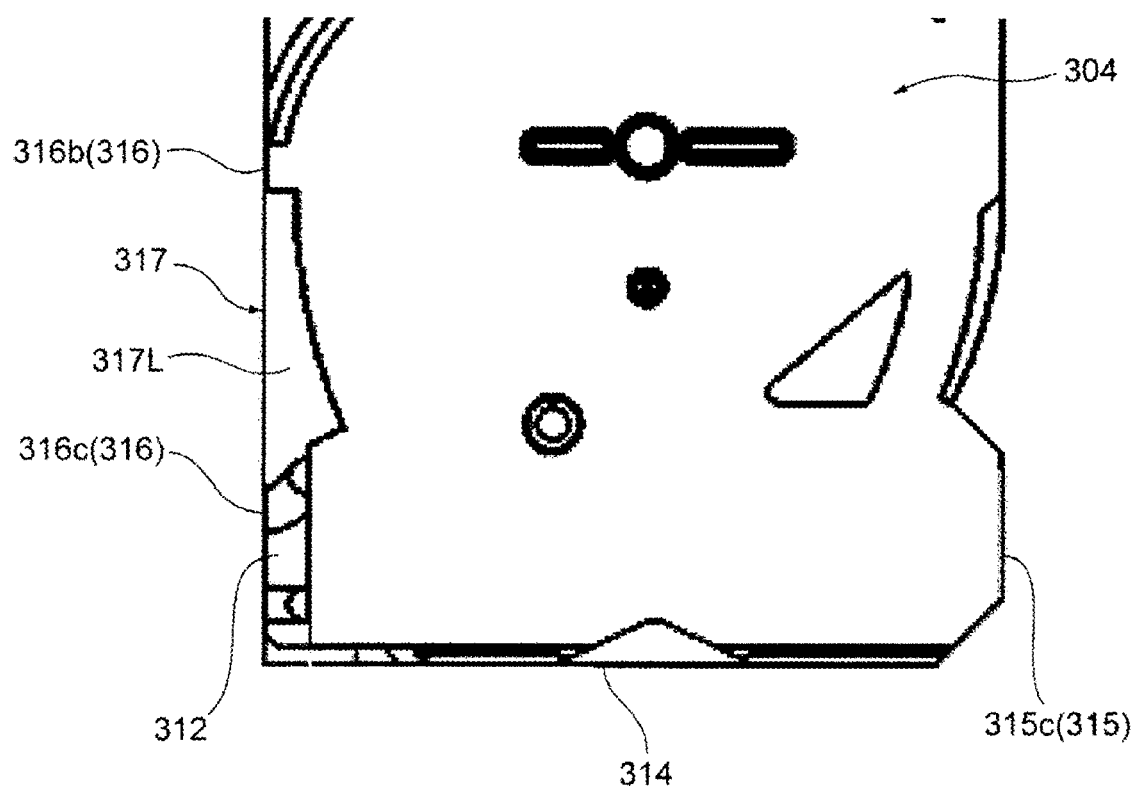
FIG. 7C is an enlarged view of main portions of the thermal flowmeter in Example 1.
Figure 7D:
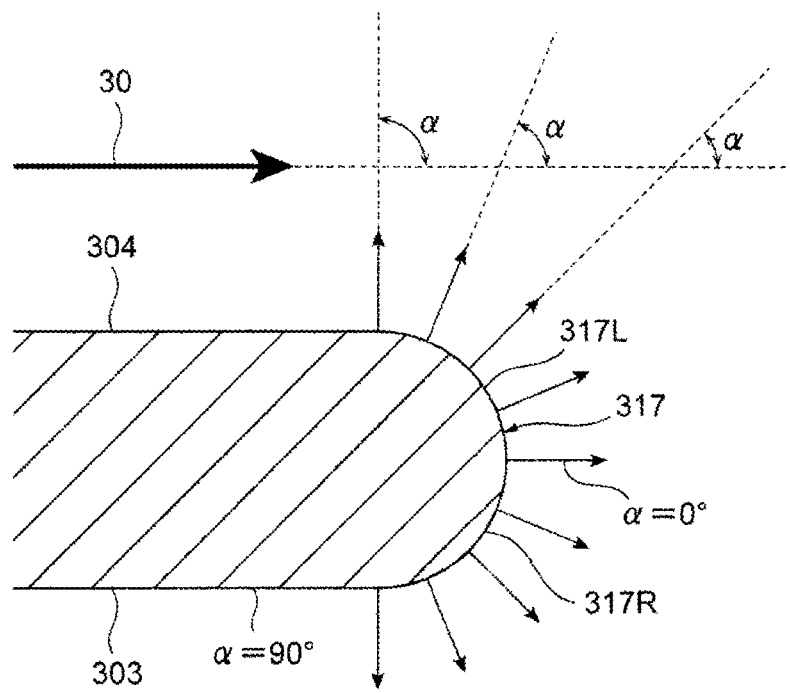
FIG. 7D is a conceptual diagram for explaining a configuration of a curved surface portion.
Figure 7E:
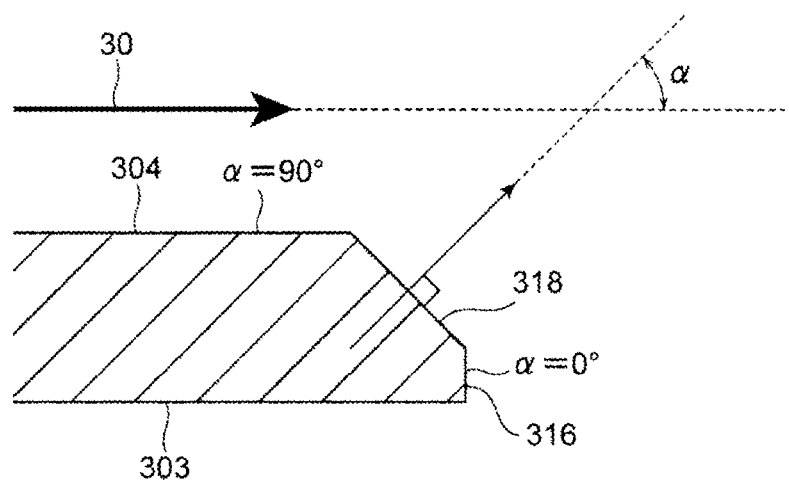
FIG. 7E is a conceptual diagram for explaining a configuration of an inclined surface.

FIG. 6 is a perspective view illustrating an exterior of an exterior of a thermal flowmeter in Example 1, FIGS. 7A to 7C are enlarged views of main portions of the thermal flowmeter in Example 1, FIG. 7D is a conceptual diagram for explaining a configuration of a curved surface portion, and FIG. 7E is a conceptual diagram for explaining a configuration of an inclined surface.

As illustrated in FIG. 6, a curved surface portion 317 is provided at the downstream end portion 316 of the housing 302. The curved surface portion 317 is provided near the first outlet 312 and the second outlet 313, and is disposed at a position between the intermediate part 316b and the distal end part 316c of the downstream end portion 316 in the present example. The curved surface portion 317 has a curved shape having a longitudinal direction in which the housing 302 extends as the axis center, and, specifically, has a streamlined shape in which a section is a projecting arc curve. As illustrated in FIG. 7D, the curved surface portion 317 has curved surfaces 317R and 317L are inclined surfaces in which an angle formed between a normal vector and the main flow direction of the gas 30 to be measured is in an angle range of 0 degrees<α<90 degrees, and the angle formed between the normal vector and the main flow direction of the gas 30 to be measured is gradually reduced from the main flow direction upstream side of the gas 30 to be measured toward the downstream side.

The curved surfaces 317R and 317L of the curved surface portion 317 have shapes in which curved surfaces with one or more curvature radii are smoothly continued, and have substantially constant sectional shapes between the intermediate part 316b and the distal end part 316c. A downstream end thereof is formed to be coplanar with the intermediate part 316b and the distal end part 316c of the downstream end portion 316 of the housing 302.

As illustrated in FIG. 7B, the curved surface portion 317 is disposed such that at least a part of the curved surface 317R on one end side in the thickness width direction of the housing 302 is located within a range of a thickness width WR of the second outlet 313, and is disposed such that at least a part of the curved surface 317L on the other end side in the thickness width direction of the housing 302 is located within a range of a thickness width WL of the first outlet 312.

For example, as in the present example, in a case of a physical quantity measurement device having a structure in which a part of the bypass passage 307 branches in order to discharge contaminants, it is necessary to ensure measurement accuracy by increasing a flow velocity and a discharge effect. (a) Unless a discharge port is open toward the main flow direction downstream side, contaminants may be collected at a corner. (b) Unless a branch passage rotates as greatly as possible, a flow is not bent, a separation vortex increases, a flow velocity distribution difference between a steady flow and a pulsation flow increases, and thus a pulsation error increases. (c) If a main outlet is disposed further toward the main flow direction upstream side than a branch portion, a flow of the periphery of the flow rate measurement portion 602 causes overshoot or undershoot during a transient flow rate change, and thus it is hard to measure an accurate flow rate change. For the above reasons of (a), (b), and (c), a discharge port (corresponding to the first outlet 312) and a main outlet (corresponding to the second outlet 313) are preferably disposed further toward the main flow direction downstream side than a branch portion and at the downstream end portion of the housing.

However, since the housing is disposed in the intake tube (main passage), a vertical vortex having an axis which is parallel to an extending direction of the housing, called a Karman vortex is generated near the downstream end portion of the housing, and a horizontal vortex having an axis perpendicular to the extending direction of the housing, called a blade-tip vortex is also generated. Therefore, such vortexes interfere with the gas 30 to be measured discharged from the discharge port and the main outlet, and thus there is concern that smooth discharge is hindered. In such vortexes, vortex intensity changes in a transient phenomenon such as a pulsation flow in an intake passage, so that the extent of the discharge port and the main outlet disposed at the downstream end portion of the housing being shielded by the vortexes changes, and a difference between flow velocity distributions during normal times and during pulsation is increased depending on the extent of the change such that a pulsation error occurs.

In contrast, in the present example, since the curved surface portion 317 having the curved surface of which the axis center is along the extending direction of the housing 302 is provided near the first outlet 312 and the second outlet 313, the magnitude of a vortex generated on the downstream side of the first outlet 312 and the second outlet 313 of the housing 302 can be reduced, and, particularly, the magnitude of a vertical vortex (Karman vortex) can be reduced. Therefore, it is possible to reduce the influence of a vortex on the gas 30 to be measured discharged from the first outlet 312 and the second outlet 313, to thus reduce a difference between flow velocity distributions during normal times and during pulsation, to suppress the occurrence of a pulsation error, and to improve measurement accuracy.

In the present example, as an example, a description has been made of a configuration in which the curved surface portion 317 is provided near the first outlet 312 and the second outlet 313, but any configuration may be used as long as the magnitude of a vortex can be reduced such that a vortex of the gas 30 to be measured generated around the housing 302 does not hinder discharge of the gas 30 to be measured discharged from the first outlet 312 and the second outlet 313. Therefore, for example, as illustrated in FIG. 7E, an inclined surface 318 having a predetermined inclined angle α with respect to the main flow direction of the gas 30 to be measured may be provided at the downstream end portion 316. In the present example, a description has been made of an example of a configuration in which a section of the curved surface portion 317 is constant in the extending direction of the housing 302, but this configuration is only an example, and the curved surface portion may have a shape in which a section thereof changes in the extending direction.

In the present example, since the curved surface portion 317 is disposed such that at least a part of the curved surface 317R is located within a range of the thickness width WR of the second outlet 313, and is disposed such that at least a part of the curved surface 317L is located within a range of a thickness width WL of the first outlet 312, the magnitude of a vortex generated on the downstream side of the first outlet 312 and the second outlet 313 of the housing 302 can be reduced, and a position where a vortex is generated can also be greatly separated further toward the downstream side of the housing 302. Therefore, it is possible that the gas 30 to be measured discharged from the first outlet 312 and the second outlet 313 is hardly influenced by a vortex, smooth discharge can be promoted, and thus flow rate measurement with high accuracy can be performed.

Example 2

Next, Example 2 of the present invention will be hereinafter described with reference to FIGS. 8, 9, 10A, 10B and 10C.

Figure 8:
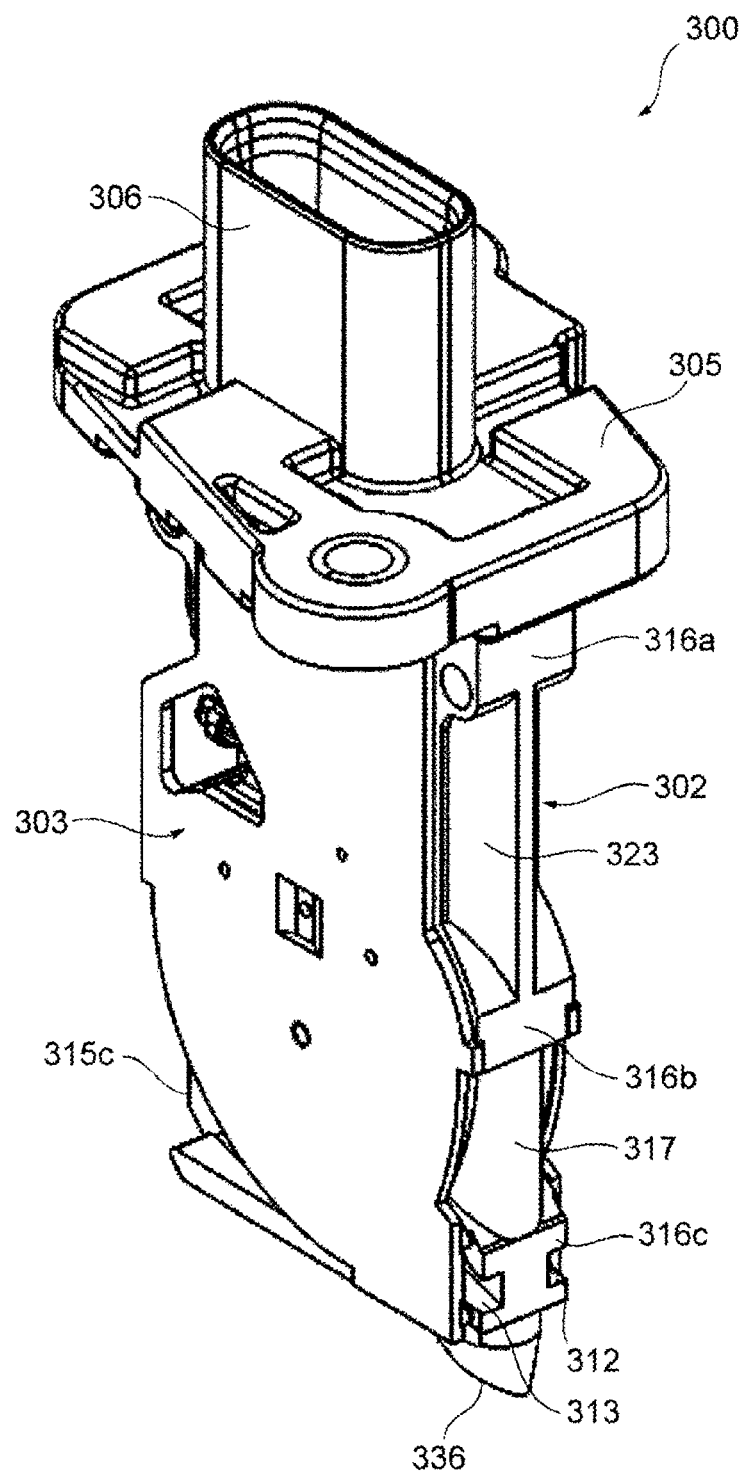
FIG. 8 is a perspective view illustrating an exterior of a thermal flowmeter in Example 2.
Figure 9:
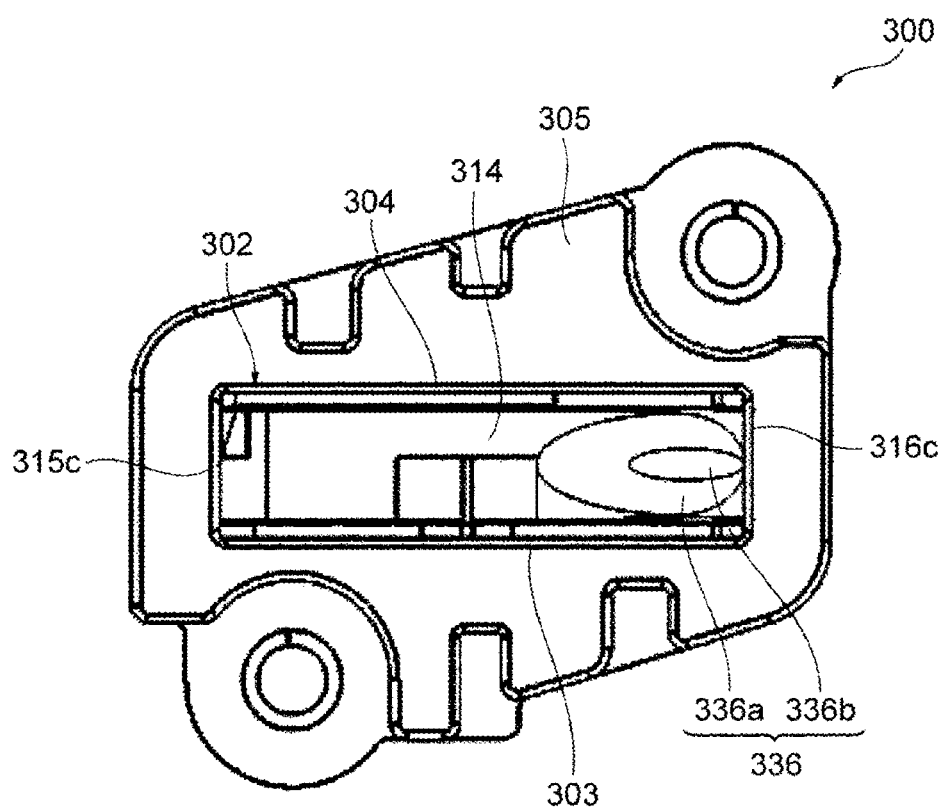
FIG. 9 is a bottom view of the thermal flowmeter in Example 2.
Figure 10A:
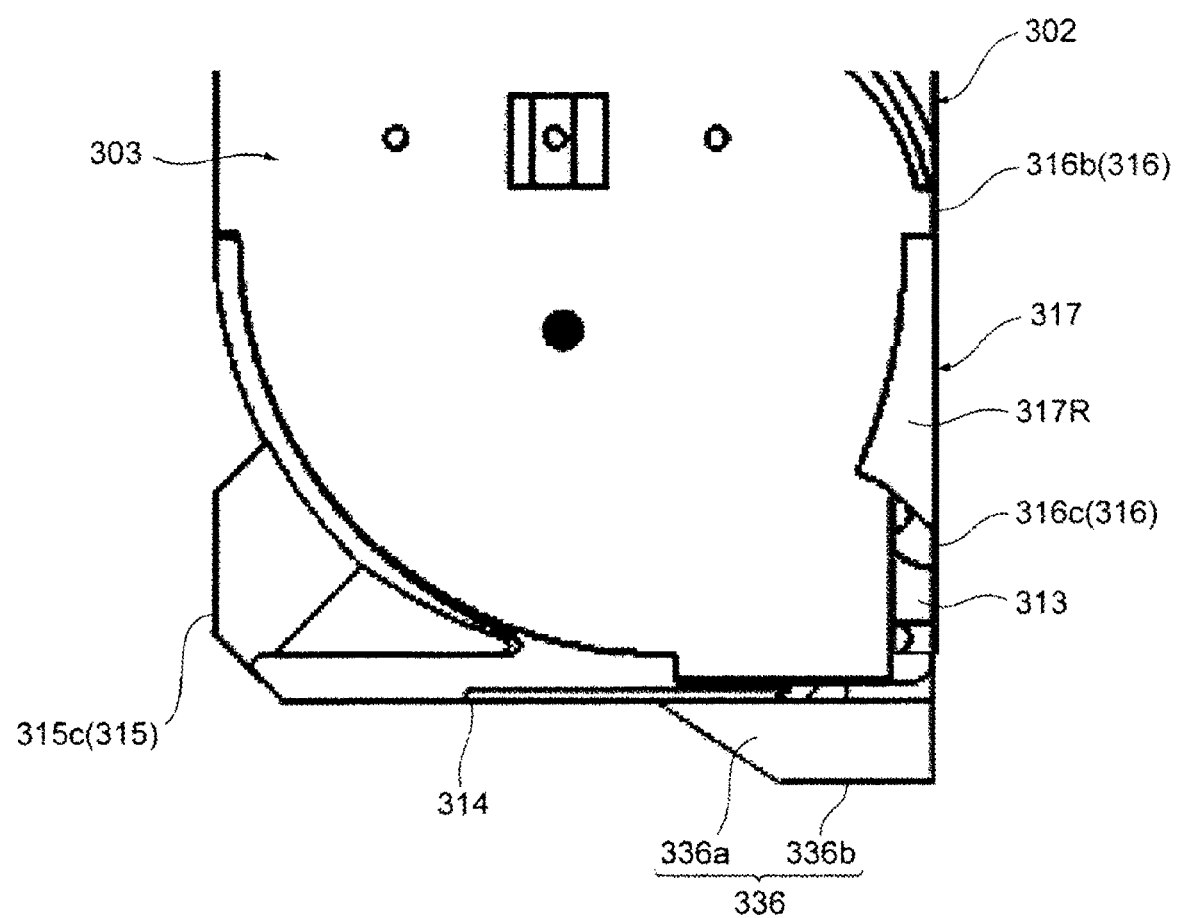
FIG. 10A is an enlarged view of main portions of the thermal flowmeter in Example 2.
Figure 10B:
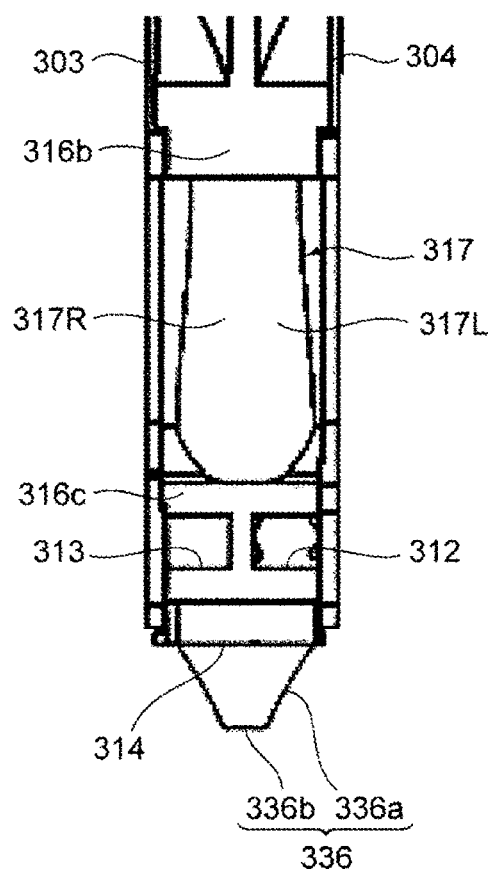
FIG. 10B is an enlarged view of main portions of the thermal flowmeter in Example 2.
Figure 10C:
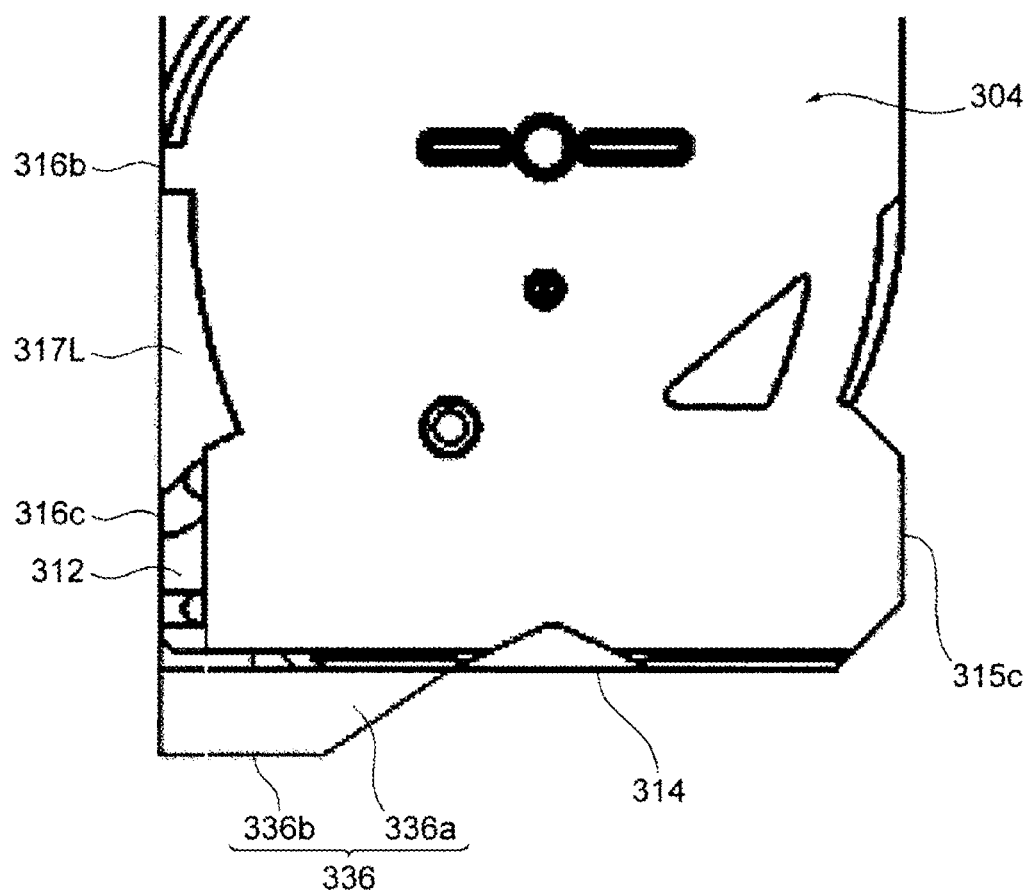
FIG. 10C is an enlarged view of main portions of the thermal flowmeter in Example 2.

FIG. 8 is a perspective view illustrating an exterior of a thermal flowmeter in Example 2, FIG. 9 is a bottom view of the thermal flowmeter in Example 2, and FIGS. 10A to 10C are enlarged views of main portions of the thermal flowmeter in Example 2. The same constituent elements as those in Example 1 are given the same reference numerals, and detailed description thereof will not be repeated.

In the present example, a feature is that a distal end blade 336 is provided on a distal end surface 314 of the housing 302 on an insertion direction distal end side in addition to the configuration of Example 1. The distal end blade 336 is provided to protrude from the distal end surface 314, and is disposed at a position biased toward the downstream end portion side of the housing 302. The distal end blade 336 is integrally formed with the housing 302, but may be provided separately, and then may be fixed via fixation means such as screws or an adhesive. As illustrated in FIG. 9, a section of the distal end blade 336 protruding from the distal end surface 314 has an elliptical and substantially columnar shape, and the distal end blade has an outer circumferential surface 336a which is formed in a tapered shape such that a section thereof is gradually reduced and narrowed toward the distal end side, and a flat head top surface 336b which is parallel to the distal end surface 314 at a distal end portion thereof.

The distal end blade 336 is disposed such that a major axis of the sectional ellipse extends from the upstream end portion side of the housing 302 to the downstream end portion side, and has a streamlined shape in which an arc on the upstream side is smaller than an arc on the downstream side. As illustrated in FIGS. 10A and 10B, an upstream surface part of the outer circumferential surface 336a is obliquely formed to be gradually directed toward the downstream side as a distance to the distal end side of the distal end blade 336 is reduced.

According to the thermal flowmeter 300 having the above-described configuration, the gas 30 to be measured flowing along the distal end surface 314 in the main passage 124 can be smoothly guided to the downstream side by the distal end blade 336, and, thus, particularly, the magnitude of a horizontal vortex (blade-tip vortex) of vortexes generated on the downstream side of the first outlet 312 and the second outlet 313 of the housing 302 can be reduced. Therefore, in addition to the advantageous effect of Example 1, it is possible to further reduce a vortex on the gas 30 to be measured discharged from the first outlet 312 and the second outlet 313, to effectively suppress the occurrence of a pulsation error, and to considerably improve measurement accuracy.

Example 3

Next, Example 3 of the present invention will be hereinafter described with reference to FIGS. 11, 12, 13A, 13B and 13C.

Figure 11:
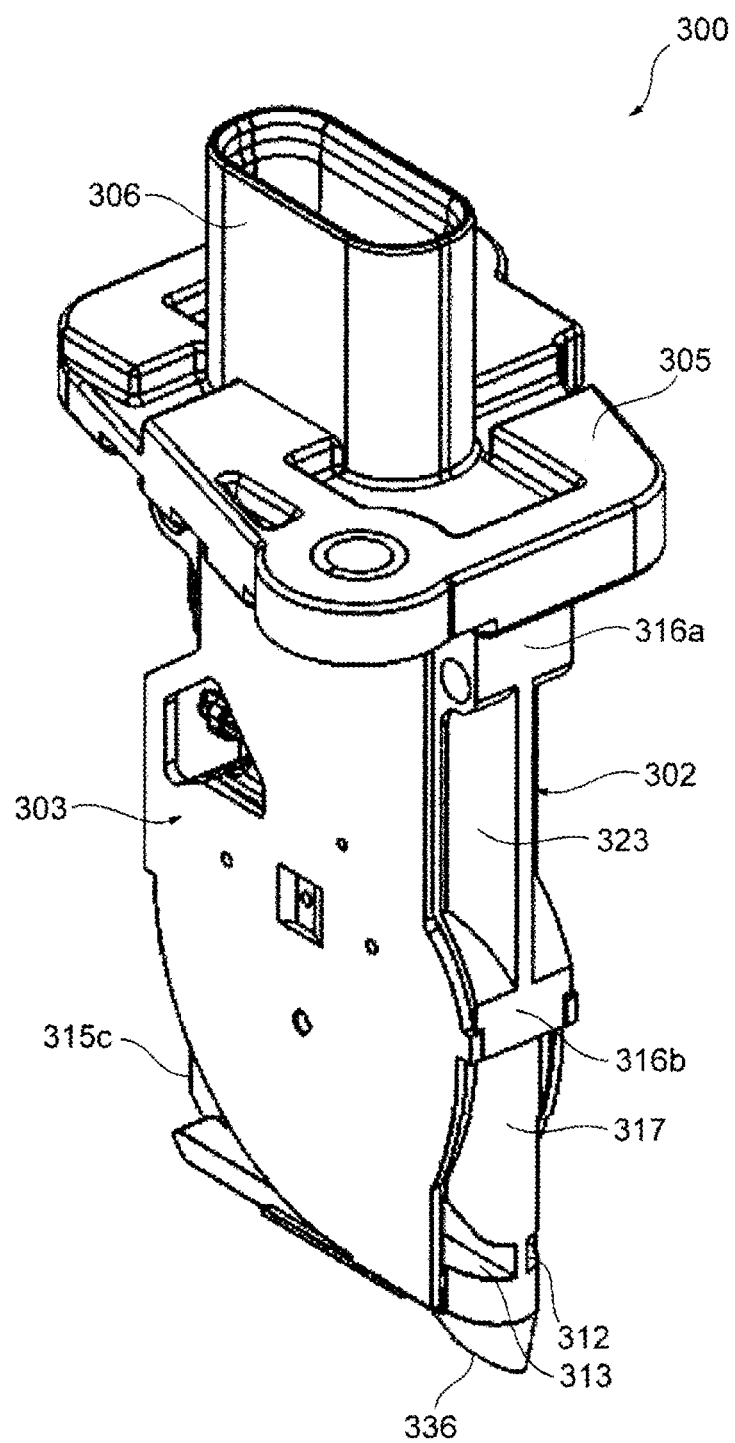
FIG. 11 is a perspective view illustrating an exterior of a thermal flowmeter in Example 3.
Figure 12:
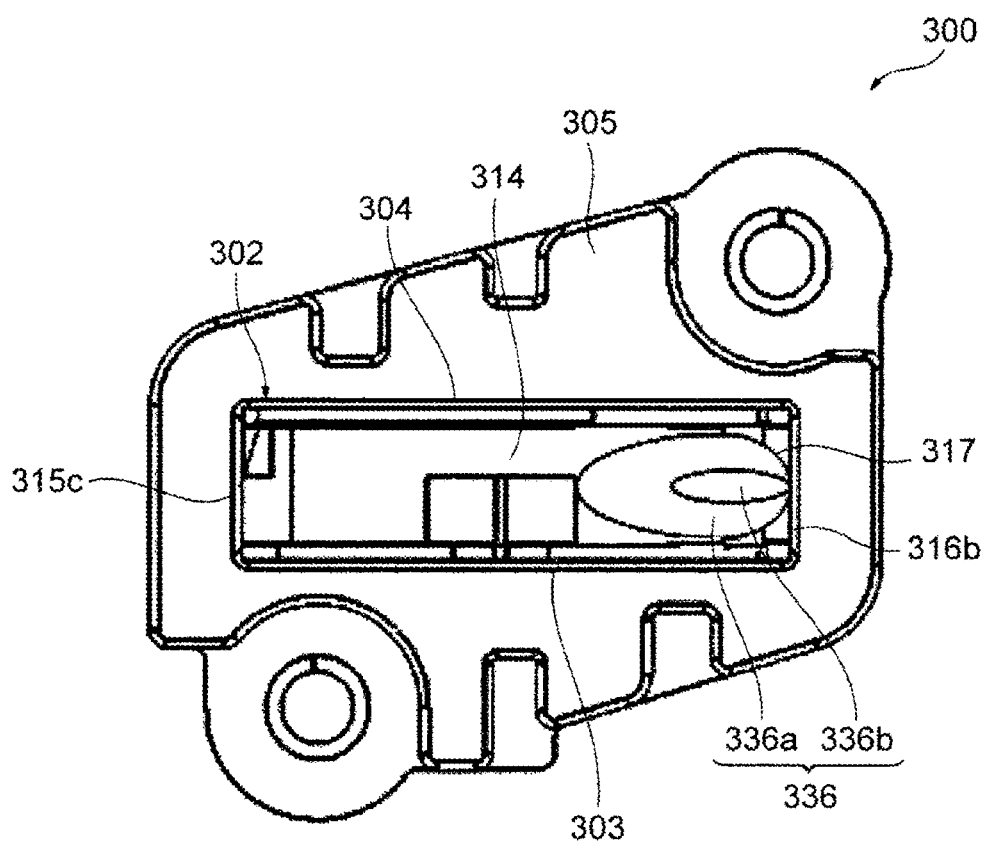
FIG. 12 is a bottom view of the thermal flowmeter in Example 3.
Figure 13A:
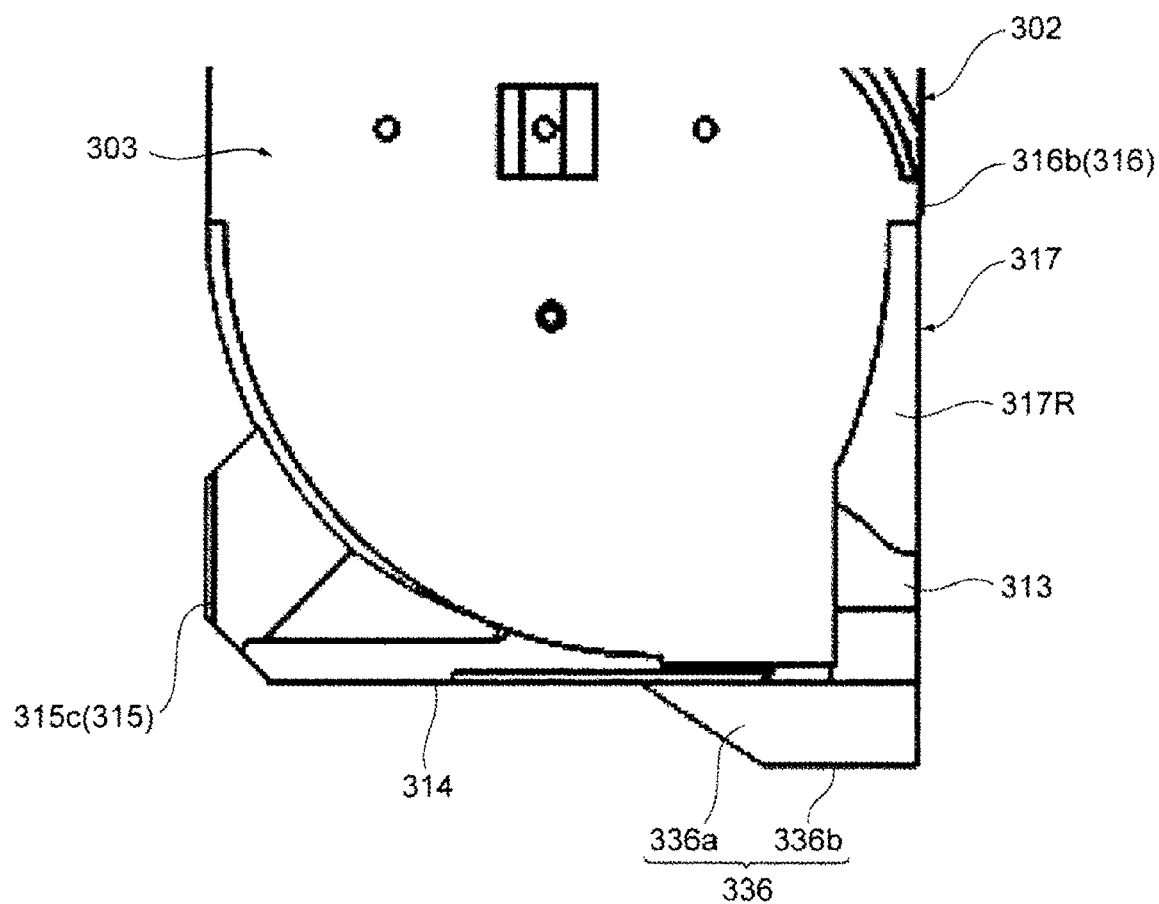
FIG. 13A is an enlarged view of main portions of the thermal flowmeter in Example 3.
Figure 13B:
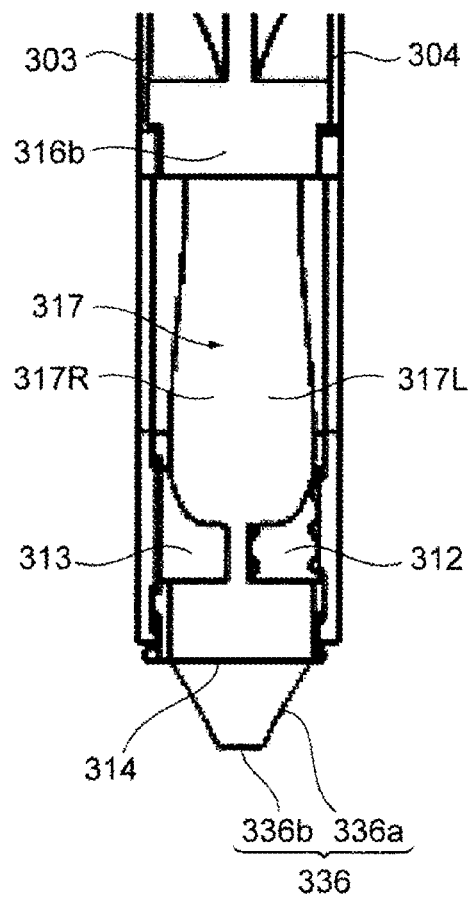
FIG. 13B is an enlarged view of main portions of the thermal flowmeter in Example 3.
Figure 13C:
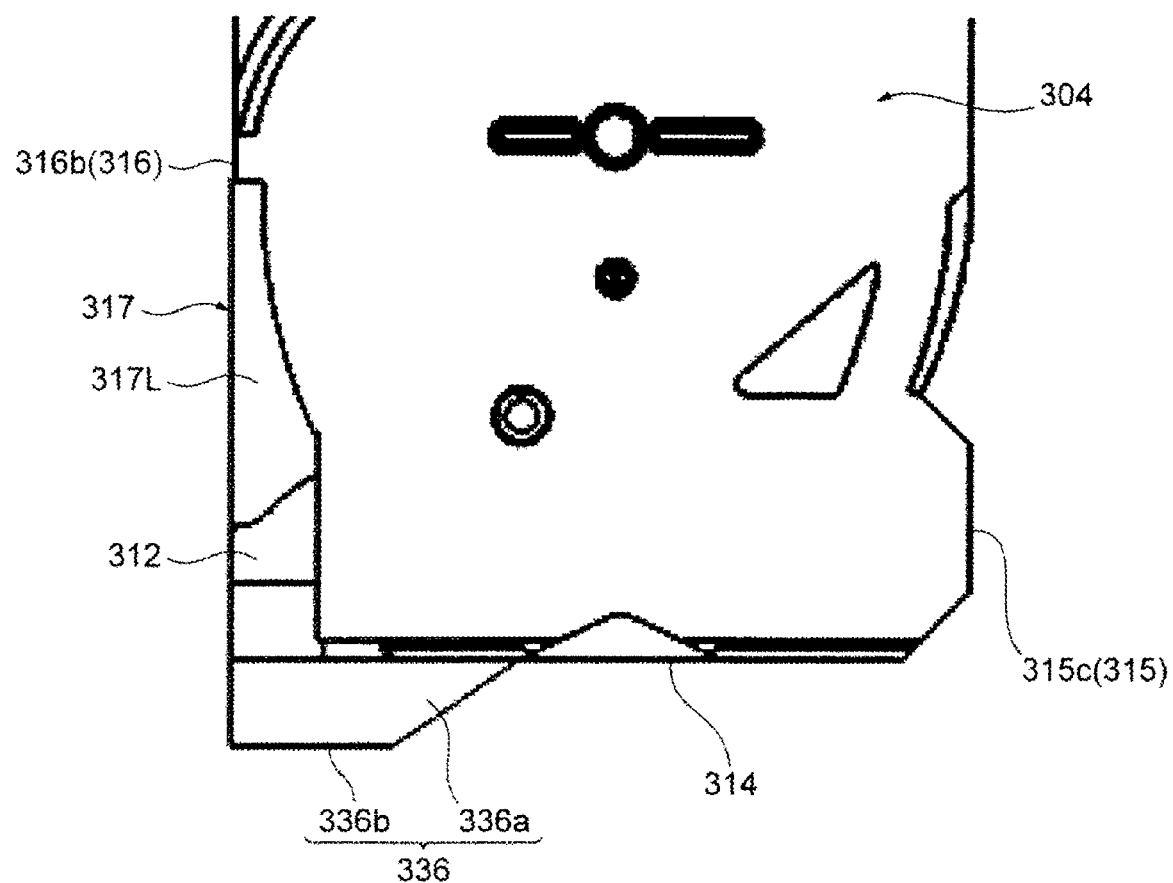
FIG. 13C is an enlarged view of main portions of the thermal flowmeter in Example 3.

FIG. 11 is a perspective view illustrating an exterior of a thermal flowmeter in Example 3, FIG. 12 is a bottom view of the thermal flowmeter in Example 3, and FIGS. 13A to 13C are enlarged views of main portions of the thermal flowmeter in Example 3. The same constituent elements as those in Examples 1 and 2 are given the same reference numerals, and detailed description thereof will not be repeated.

In the present example, a feature is that the curved surface portion 317 extends to the distal end surface 314, and the first outlet 312 and the second outlet 313 are provided on the curved surface portion 317, instead of the distal end part 316c of the downstream end portion 316 in Example 2.

The curved surface portion 317 is provided from the intermediate part 316b of the downstream end portion 316 of the housing 302 to the distal end surface 314. The first outlet 312 is formed on the curved surface 317L of the curved surface portion 317, and is open toward the main flow direction downstream side. The second outlet 313 is formed on the curved surface 317R of the curved surface portion 317, and is open toward the main flow direction downstream side.

In the present example, the curved surface portion 317 is provided instead of the distal end part 316c having a flat surface, and thus it is possible to further prevent a vertical vortex from being generated near the first outlet 312 and the second outlet 313. Therefore, compared with Example 2, it is possible to further reduce the influence of a vortex, to more effectively suppress the occurrence of a pulsation error, and to considerably improve measurement accuracy.

As mentioned above, the embodiments of the present invention have been described in detail, but the present invention is not limited to the embodiments, and various design modifications may occur within the scope without departing from the spirit of the present invention disclosed in the claims. The embodiments have been described in detail for better understanding of the present invention, and thus are not necessarily limited to including all of the above-described configurations. Some configurations of a certain embodiment may be replaced with some configurations of another embodiment, and some configurations or all configurations of another embodiment may be added to configurations of a certain embodiment. The configurations of other embodiments may be added to, deleted from, and replaced with some of the configurations of each embodiment.

REFERENCE SIGNS LIST

300 THERMAL FLOWMETER
302 HOUSING
303 FRONT COVER
304 REAR COVER
307 BYPASS PASSAGE
312 FIRST OUTLET (OUTLET)
313 SECOND OUTLET
317 CURVED SURFACE PORTION
602 FLOW RATE MEASUREMENT PORTION

The invention claimed is:

1. A thermal flowmeter comprising:
a housing that has a fixation portion and a measurement portion that is disposed in a main passage through which a gas to be measured flows with a distal end part of the housing being supported in a cantilever state at the fixation portion; and
a bypass passage that is provided in the measurement portion of the housing and includes a flow rate measurement portion, the gas to be measured being adapted to be taken into the bypass passage from the main passage, and a flow rate of the gas to be measured being adapted to be measured by the flow rate measurement portion disposed in the bypass passage,
wherein:
the measurement portion of the housing has a length that extends in a vertical direction intersecting a main flow direction of the gas to be measured, a depth that extends along the main flow direction of the gas to be measured, and a width that extends in a thickness width direction which is perpendicular to the main flow direction of the gas to be measured,
an outlet of the bypass passage is provided at a distal end part of a downstream end portion of the measurement portion of the housing,
the outlet of the bypass passage has a first outlet and a second outlet disposed side by side in the thickness width direction of the measurement portion of the housing, the first outlet and the second outlet being open toward a downstream side in the main flow direction of the gas to be measured,
in the housing, an inclined surface is provided between the fixation portion and a portion where the first outlet and the second outlet are disposed, such that the entirety of the inclined surface is positioned above the first outlet and the second outlet in the vertical direction of the measurement portion of the housing,
the inclined surface has a curved surface in the thickness width direction of the measurement portion of the housing, the inclined surface being provided such that at least a part of the curved surface on one side in the thickness width direction of the measurement portion of the housing is located within a range of a thickness width of the first outlet, and at least a part of the curved surface on another side in the thickness width direction of the measurement portion of the housing is located within a range of a thickness width of the second outlet, and
the distal end part of the downstream end portion of the measurement portion of the housing has a flat surface, and the first outlet and the second outlet are provided on the flat surface.

2. The thermal flowmeter according to claim 1, wherein the inclined surface is provided such that an angle formed between a normal vector of the inclined surface and a main flow direction of a gas to be measured flowing through the main passage is in an angle range of 0 degrees<α<90 degrees.

3. The thermal flowmeter according to claim 2,
wherein the angle formed between the normal vector and the main flow direction of the gas to be measured is gradually reduced from an upstream side in the main flow direction of the gas to be measured toward the downstream side.

4. The thermal flowmeter according to claim 1,
wherein the curved surface includes two symmetrical surfaces provided in a pair in the thickness width direction of the measurement portion of the housing.

5. The thermal flowmeter according to claim 1,
wherein a curved surface portion having the curved surface is provided between the distal end part and an intermediate part of the measurement portion of the housing.

6. The thermal flowmeter according to claim 1,
wherein, in the housing, a distal end blade is provided on a surface of the distal end part of the measurement portion of the housing.

7. The thermal flowmeter according to claim 6,
wherein the distal end blade has a tapered shape from a basal end toward a distal end.

\* \* \* \* \*